US012684130B2

(12) United States Patent (10) Patent No.: US 12,684,130 B2
Kerofsky et al. (45) Date of Patent: Jul. 14, 2026

(54) AFFINE PREDICTION USING AN EPIPOLAR-BASED CONSTRAINT FOR PICTURES OF DIFFERING RESOLUTIONS

(71) Applicant: QUALCOMM Incorporated, San Diego, CA (US)

(72) Inventors: Louis Joseph Kerofsky, San Diego, CA (US); Varun Ravi Kumar, San Diego, CA (US); Senthil Kumar Yogamani, Headford (IE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/605,215

(22) Filed: Mar. 14, 2024

(65) Prior Publication Data

US 2025/0294161 A1 Sep. 18, 2025

(51) Int. Cl.
| | |
|---|---|
| *H04N 19/14* | (2014.01) |
| *H04N 19/105* | (2014.01) |
| *H04N 19/172* | (2014.01) |
| *H04N 19/176* | (2014.01) |
| *H04N 19/46* | (2014.01) |
| *H04N 19/50* | (2014.01) |
| *H04N 19/70* | (2014.01) |

(52) U.S. Cl.
CPC ........... *H04N 19/14* (2014.11); *H04N 19/105* (2014.11); *H04N 19/172* (2014.11); *H04N 19/176* (2014.11); *H04N 19/46* (2014.11); *H04N 19/50* (2014.11); *H04N 19/70* (2014.11)

(58) Field of Classification Search
CPC ...... H04N 19/52; H04N 19/54; H04N 19/573; H04N 19/53; H04N 19/583
See application file for complete search history.

(56) References Cited

U.S. PATENT DOCUMENTS

| | | | |
|---|---|---|---|
| 2011/0128353 A1* | 6/2011 | Leung | H04N 19/597 |
| | | | 348/47 |
| 2013/0038696 A1* | 2/2013 | Ding | H04N 13/271 |
| | | | 348/47 |
| 2018/0144458 A1* | 5/2018 | Xu | H04N 13/271 |
| 2018/0268237 A1 | 9/2018 | Stanimirovic et al. | |
| 2018/0270500 A1* | 9/2018 | Li | H04N 19/52 |
| 2020/0226352 A1 | 7/2020 | Coulter et al. | |

(Continued)

OTHER PUBLICATIONS

"Current Picture Referencing mode with Affine Model in VVC"—Cao et al., 2019 IEEE 4th International Conference on Signal and Image Processing (Year: 2019).*

(Continued)

*Primary Examiner* — Mainul Hasan
(74) *Attorney, Agent, or Firm* — Shumaker & Sieffert, P.A.

(57) ABSTRACT

An apparatus configured to encode video data is configured to receive a first picture having a first resolution, receive a second picture having a second resolution, wherein the second resolution is different than the first resolution, and wherein the first picture and the second picture have at least partially overlapping fields of view, and encode a current block of the first picture, relative to the second picture, using affine prediction with a single parameter search, wherein the single parameter search is performed along an epipolar curve, and wherein the single parameter search is used to determine parameters of an affine prediction model.

16 Claims, 10 Drawing Sheets

(56) References Cited

U.S. PATENT DOCUMENTS

| 2023/0008027 | A1* | 1/2023 | Ding | H04N 13/239 |
|---|---|---|---|---|
| 2023/0134017 | A1* | 5/2023 | Chen | H04N 19/139 |
| | | | | 375/240.15 |
| 2023/0247226 | A1 | 8/2023 | Narroschke | |
| 2023/0328225 | A1* | 10/2023 | Li | H04N 19/139 |
| | | | | 375/240.15 |
| 2023/0403406 | A1* | 12/2023 | Bordes | H04N 19/176 |

OTHER PUBLICATIONS

"Epipolar Geometry-Based Side Information Creation for Multiview Wyner-Ziv Video Coding"—Brites et al., IEEE Transactions on Circuits and Systems for Video Technology, vol. 24, No. 10, Oct. 2014 (Year: 2014).*
ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.
ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.
MIV: "Specification for Streaming Storage of Immersive Content", MPEG Immersive Video (MIV), Retrieved on Jun. 4, 2024, pp. 1-9.
Co-pending U.S. Appl. No. 18/605,146, filed Mar. 14, 2024.

* cited by examiner

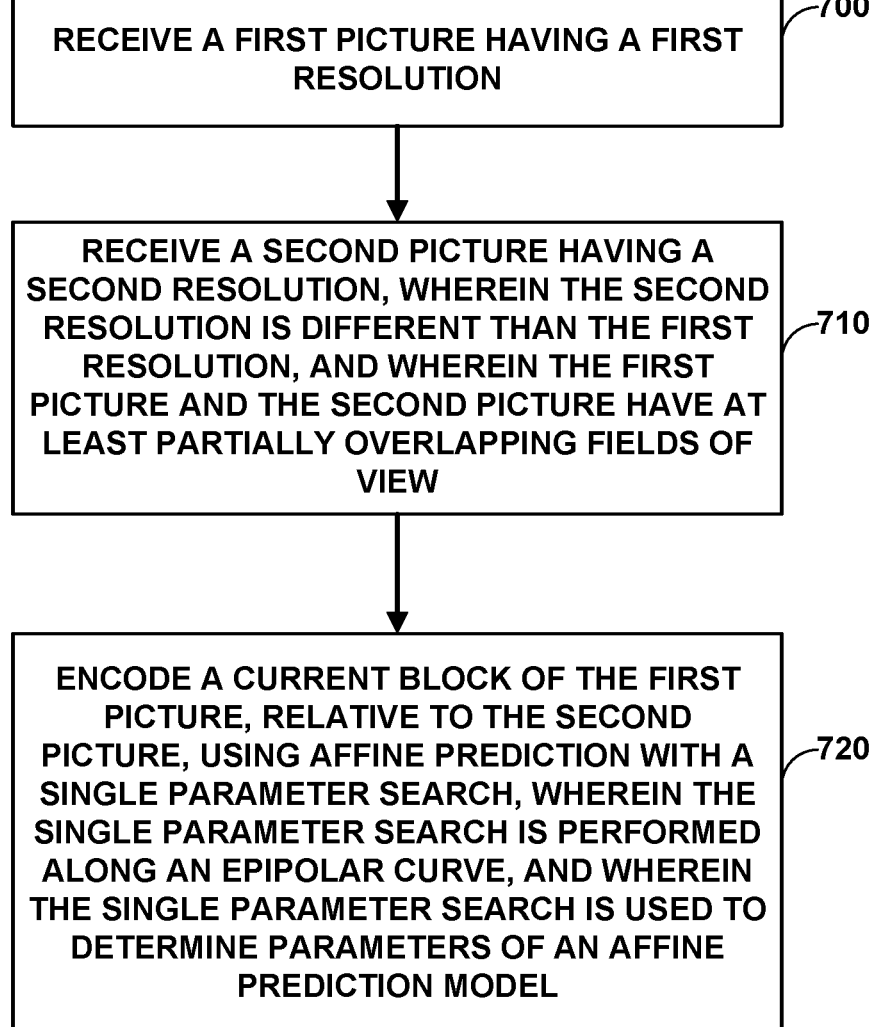

RECEIVE A FIRST PICTURE HAVING A FIRST RESOLUTION ⟋700

RECEIVE A SECOND PICTURE HAVING A SECOND RESOLUTION, WHEREIN THE SECOND RESOLUTION IS DIFFERENT THAN THE FIRST RESOLUTION, AND WHEREIN THE FIRST PICTURE AND THE SECOND PICTURE HAVE AT LEAST PARTIALLY OVERLAPPING FIELDS OF VIEW ⟋710

ENCODE A CURRENT BLOCK OF THE FIRST PICTURE, RELATIVE TO THE SECOND PICTURE, USING AFFINE PREDICTION WITH A SINGLE PARAMETER SEARCH, WHEREIN THE SINGLE PARAMETER SEARCH IS PERFORMED ALONG AN EPIPOLAR CURVE, AND WHEREIN THE SINGLE PARAMETER SEARCH IS USED TO DETERMINE PARAMETERS OF AN AFFINE PREDICTION MODEL ⟋720

FIG. 7

AFFINE PREDICTION USING AN EPIPOLAR-BASED CONSTRAINT FOR PICTURES OF DIFFERING RESOLUTIONS

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Autonomous vehicles and semi-autonomous vehicles may include an advanced driver assistance system (ADAS) using sensors and software to help operate the vehicles. An ADAS may use video captured from one or more cameras, as the vehicle is operating to perform various tasks for aiding in the control of the vehicle. In some examples, a computing system in the vehicle may be configured to encode the video for future use and/or transmission.

SUMMARY

In general, this disclosure describes techniques for encoding and decoding video data. In particular, this disclosure describes techniques for performing affine-based prediction of blocks of video data in a current picture captured with a first resolution relative to a reference picture captured at a different resolution relative to the current picture. This affine prediction may use existing affine motion prediction tools applied to the individual camera images rather than being used for prediction between images of a single camera captured across time, e.g., motion. In some examples, one of the current picture or the reference picture may also be distorted relative to the other picture. The current picture and the reference picture may be captured at the same time or at different times. At least a portion of the scene captured by the current picture and the reference picture are overlapping. In one example, the techniques of this disclosure may be used to encode and/or decode video data captured by cameras of a vehicle or any other type of moving object.

In examples of the disclosure, a video encoder may be configured to use epipolar-based constraints to reduce the complexity of estimating the affine motion predictor when predicting blocks between the pictures having differing resolutions. When coding a block using affine prediction, a video encoder may determine an epipolar curve from corners of the block. The epipolar curve is based on the known camera geometry of the current use case (e.g., the pose of the camera on the vehicle). The video encoder may determine a displacement (e.g., a depth) along the epipolar curve in the reference picture that minimizes a block matching error.

The video encoder may use the determined displacement to determine other affine parameters for the affine motion model used for the affine prediction. The video encoder may then use the affine parameters to determine a prediction block and encode the block of the current picture relative to the prediction block. By constraining the search to a single parameter (e.g., the displacement) along an epipolar curve, the techniques of this disclosure compensate for the differences in resolution and/or distortion between the two pictures, and reduce the encoding complexity, memory requirements, and encoding times for video sources with complex motion, while still allowing for the more complex affine motion models to be used.

In one example, this disclosure describes a method of encoding video data, the method comprising receiving a first picture having a first resolution. receiving a second picture having a second resolution, wherein the second resolution is different than the first resolution, and wherein the first picture and the second picture have at least partially overlapping fields of view, and encoding a current block of the first picture, relative to the second picture, using affine prediction with a single parameter search, wherein the single parameter search is performed along an epipolar curve, and wherein the single parameter search is used to determine parameters of an affine prediction model.

In another example, this disclosure describes an apparatus configured to encode video data, the apparatus comprising a memory and processing circuitry in communication with the memory, the processing circuitry configured to receive a first picture having a first resolution, receive a second picture having a second resolution, wherein the second resolution is different than the first resolution, and wherein the first picture and the second picture have at least partially overlapping fields of view, and encode a current block of the first picture, relative to the second picture, using affine prediction with a single parameter search, wherein the single parameter search is performed along an epipolar curve, and wherein the single parameter search is used to determine parameters of an affine prediction model.

In another example, this disclosure describes a non-transitory computer-readable storage medium storing instructions that, when executed, cause one or more processors configured to encode video data to receive a first picture having a first resolution, receive a second picture having a second resolution, wherein the second resolution is different than the first resolution, and wherein the first picture and the second picture have at least partially overlapping fields of view, and encode a current block of the first picture, relative to the second picture, using affine prediction with a single parameter search, wherein the single parameter search is performed along an epipolar curve, and wherein the single parameter search is used to determine parameters of an affine prediction model.

The details of one or more examples are set forth in the accompanying drawings and the description below. Other features, objects, and advantages will be apparent from the description, drawings, and claims.

BRIEF DESCRIPTION OF DRAWINGS

FIG. 7 is a flow diagram illustrating an example method for encoding video data in accordance with the techniques of this disclosure.

DETAILED DESCRIPTION

Figure 1:
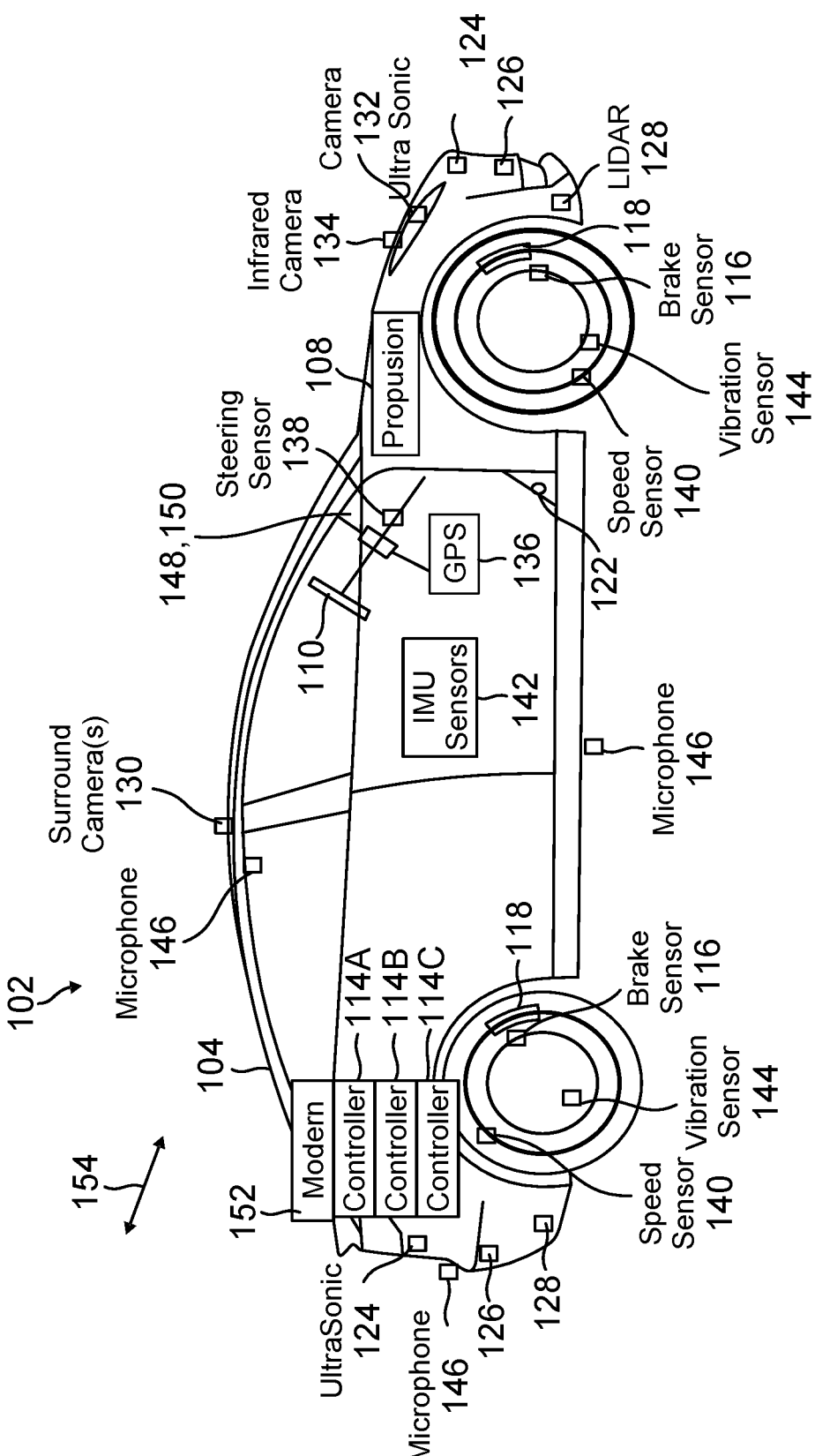
FIG. 1 is a diagram of an example autonomous vehicle in accordance with the techniques of this disclosure.

Aspects of the present disclosure provide apparatuses, methods, computing systems and non-transitory computer-readable media for performing video encoding using affine prediction and an epi-polar based constraint for two pictures having differing resolutions.

Video captured from two cameras with overlapping fields of view allows prediction of one camera image from the second camera image at the same time instant. The camera may have different resolution or optical distortion making the prediction of one camera image from another complex. Accurate prediction is typically important for effective compression, as redundancy is exploited by encoding only differences between frames.

In some example use cases, including vehicle use cases, pictures may be captured by multiple different cameras at the same time. The cameras may have different resolutions and/or different distortion profiles relative to each other. For examples, one camera may have a wide depth of field (e.g., a pinhole camera), but a relatively narrow field of view. Another camera may have a narrow depth of field (e.g., a fisheye camera), but a relatively wide field of view. In some examples, a fisheye camera may produce a distorted image to achieve the wide field of view. In general, pinhole cameras may provide better images for distant objects in a scene, while fisheye cameras may better capture objects that are very close. It may be desirable to perform inter-frame prediction between two pictures captured by two different cameras that capture overlapping scenes. However, the different resolution or distortion profiles of such cameras makes prediction accuracy difficult.

Complex prediction models, like the affine model in Versatile Video Coding (VVC) standard, which supports 4 or 6 degrees of freedom per block (e.g., a coding unit (CU)), can improve compression but have high complexity in determining model parameters. That is affine motion prediction video encoding in VVC may have undesirably high processing, memory, and/or time requirements for some applications, such as encoding video in a vehicle. The prediction model of VVC is typically used to predict across time to reduce temporal redundancy, but in this disclosure, the prediction model is extended to predict between different views captured at the same time instant.

Video compression is important for reducing data rates in applications like autonomous vehicles which capture high resolution video from multiple cameras. However, video from moving vehicles has challenging characteristics, including high speeds, zooming, and large depth variation. The complexity of finding optimal parameters for sophisticated prediction models, such as affine prediction models, is therefore significant. If model parameters cannot be determined effectively, prediction quality degrades, resulting in increased bitrate for a target quality level.

In summary, complex motion inherent in video from moving cameras, and/or cameras with different resolution or distortion profiles, increases the need for accurate, flexible prediction modeling for compression. But more sophisticated motion models have high complexity in parameter determination. Methods to simplify parameter search for complex models, or selectively apply simpler models, may improve compression efficiency for video from moving cameras viewing complex real-world scenes.

In one example of the disclosure, a video encoder may be configured to use epipolar-based constraints to reduce the complexity of estimating the affine predictor estimation when performing inter-frame coding between two pictures with different resolution and/or distortion profiles. When coding a block (e.g., a CU) using inter-frame affine prediction, a video encoder may determine an epipolar curve from corners of the block. The epipolar curve is based on the known camera geometry of the current use case (e.g., the pose of the camera on the vehicle) and knowledge of the relative locations of each camera which may be determined from system construction or estimated from prior video frames. The video encoder may determine a displacement (e.g., a depth) along the epipolar curve in the reference picture that minimizes a block matching error. Note that in some examples, the epipolar curve may be straight and may be considered an epipolar line. In the context of this disclosure, the terms epipolar line and epipolar curve may be used interchangeably.

The video encoder may use the determined displacement to determine other affine parameters for the affine prediction model used for the affine prediction. The video encoder may then use the affine parameters to determine a prediction block and encode the block of the current picture relative to the prediction block. By constraining the search to a single parameter (e.g., the displacement) along an epipolar curve, rather than searching two or three two-dimensional control point motion vectors, the techniques of this disclosure reduce the encoding complexity, memory requirements, and encoding times for video sources with complex motion, while still allowing for the more complex affine prediction models to be used.

FIG. 1 is a diagram of an example autonomous vehicle, in accordance with the techniques of this disclosure. Vehicle 102 in the example shown may comprise any vehicle (such as a car, van or truck) that can accommodate a human driver and/or human passengers. Vehicle 102 may include a vehicle body 104 suspended on a chassis, in this example comprised of four wheels and associated axles.

A propulsion system 108, such as an internal combustion engine, hybrid electric power plant, or even all-electric engine, may be connected to drive some or all the wheels via a drive train, which may include a transmission (not shown). A steering wheel 110 may be used to steer some or all the wheels to direct vehicle 102 along a desired path when the propulsion system 108 is operating and engaged to propel the vehicle 102. Steering wheel 110 or the like may be optional for Level 5 implementations. One or more controllers 114A-114C (a controller 114) may provide autonomous capabilities in response to signals continuously provided in real-time from an array of sensors, as described more fully below.

Each controller 114 may be one or more onboard computer systems that may be configured to perform deep learning, machine learning (ML), and/or artificial intelligence (AI) functionality and output autonomous operation commands to vehicle 102 and/or assist the human vehicle driver in driving. Each vehicle may have any number of distinct controllers for functional safety and additional features. For example, controller 114A may serve as the primary computer for autonomous driving functions, controller 114B may serve as a secondary computer for functional safety functions, controller 114C may provide AI functionality for in-camera sensors, and controller 114D (not shown in FIG. 1) may provide infotainment functionality and provide additional redundancy for emergency situations.

Controller 114 may send command signals to operate vehicle brakes (using brake sensor 116) via one or more braking actuators 118, operate steering mechanism via a steering actuator, and operate propulsion system 108 which also receives an accelerator/throttle actuation signal 122. Actuation may be performed by methods known to persons of ordinary skill in the art, with signals typically sent via the Controller Area Network data interface ("CAN bus"), a network inside modern vehicles used to control brakes, acceleration, steering, windshield wipers, and the like. The CAN bus may be configured to have dozens of nodes, each with its own unique identifier (CAN ID). The bus may be read to find steering wheel angle, ground speed, engine revolutions per minute (RPM), button positions, and other vehicle status indicators. The functional safety level for a CAN bus interface is typically Automotive Safety Integrity Level (ASIL) B. Other protocols may be used for communicating within a vehicle, including FlexRay and Ethernet.

In an aspect, an actuation controller may be provided with dedicated hardware and software, allowing control of throttle, brake, steering, and shifting. The hardware may provide a bridge between the vehicle's CAN bus and the controller 114, forwarding vehicle data to controller 114 including the turn signals, wheel speed, acceleration, pitch, roll, yaw, Global Positioning System (GPS) data, tire pressure, fuel level, sonar, brake torque, and others. Similar actuation controllers may be configured for any make and type of vehicle, including special-purpose patrol and security cars, robo-taxis, long-haul trucks including tractortrailer configurations, tiller trucks, agricultural vehicles, industrial vehicles, and buses.

Controller 114 may provide autonomous driving outputs in response to an array of sensor inputs including, for example: one or more ultrasonic sensors 124, one or more radio detection and ranging (RADAR) sensors 126, one or more Light Detection and Ranging ("LIDAR") sensors 128, one or more surround cameras 130 (typically such cameras are located at various places on vehicle body 104 to image areas all around the vehicle body), one or more cameras 132 (in an aspect, at least one such camera may face forward to provide object recognition in the vehicle's path), one or more infrared cameras 134, GPS unit 136 that provides location coordinates, a steering sensor 138 that detects the steering angle, speed sensors 140 (one for each of the wheels), an inertial sensor or inertial measurement unit (IMU) 142 that monitors movement of vehicle body 104 (this sensor may be, for example, an accelerometer(s) and/or a gyro-sensor(s) and/or a magnetic compass(es)), tire vibration sensors 144, and microphones 146 placed around and inside the vehicle. Other sensors may also be used.

Controller 114 may also receive inputs from an instrument cluster 148 and may provide human-perceptible outputs to a human operator via human-machine interface (HMI) display(s) 150, an audible annunciator, a loudspeaker and/or other means. In addition to traditional information such as velocity, time, and other well-known information, HMI display may provide the vehicle occupants with information regarding maps and vehicle's location, the location of other vehicles (including an occupancy grid) and even the controller's identification of objects and status. For example, HMI display 150 may alert the passenger when the controller has identified the presence of a water puddle, stop sign, caution sign, or changing traffic light and is taking appropriate action, giving the vehicle occupants peace of mind that the controller is functioning as intended. In an aspect, instrument cluster 148 may include a separate controller/processor configured to perform deep learning and AI functionality.

Vehicle 102 may collect data that is preferably used to help train and refine the neural networks used for autonomous driving. The vehicle 102 may include modem 152, preferably a system-on-a-chip (SoC) that provides modulation and demodulation functionality and allows the controller 114 to communicate over the wireless network 154. Modem 152 may include a radio frequency (RF) front-end for up-conversion from baseband to RF, and down-conversion from RF to baseband, as is known in the art. Frequency conversion may be achieved either through known direct-conversion processes (direct from baseband to RF and vice-versa) or through super-heterodyne processes, as is known in the art. Alternatively, such RF front-end functionality may be provided by a separate chip. Modem 152 preferably includes wireless functionality substantially compliant with one or more wireless protocols such as, without limitation: long term evolution (LTE), wideband code division multiple access (WCDMA), universal mobile telecommunications framework (UMTS), global system for mobile communications (GSM), CDMA2000, or other known and widely used wireless protocols.

It should be noted that, compared to other sensors, cameras 130-134 may generate a richer set of features at a fraction of the cost. Thus, vehicle 102 may include a plurality of cameras 130-134, capturing images around the entire periphery of the vehicle 102. Camera type and lens selection depends on the nature and type of function. Vehicle 102 may have a mix of camera types and lenses to provide complete coverage around the vehicle 102. The multiple types of cameras may include cameras with different resolutions. In some examples, cameras 132 may include one or more cameras with a wide depth of field (e.g., a pinhole camera), but a relatively narrow field of view. Cameras 132 may further include one or more cameras with a narrow depth of field (e.g., a fisheye camera), but a relatively wide field of view. In some examples, a fisheye camera may produce a distorted image to achieve the wide field of view. In general, pinhole cameras may provide better images for distant objects in a scene, while fisheye cameras may better capture objects very close to vehicle 102. In some examples, a pinhole camera and fisheye camera of cameras 132 may have overlapping fields of view. Cameras 132 may support interfaces such as Gigabit Multimedia Serial link (GMSL) and Gigabit Ethernet.

In an aspect, cameras 130, 132 may include one or more monocular image sensors. Monocular image sensors tend to be ubiquitous, low cost, small, and low power, which makes such sensors desirable in a wide variety of applications such as vehicles, robots, drones, etc. In some examples, cameras 130, 132 may be responsible for capturing high-resolution images and processing them in real time. The output images of such camera-based systems may be used in applications such as depth estimation, object detection, object tracking, and/or pose detection, including the detection and recognition of static or moving objects, such as other vehicles, pedestrians, traffic signs, and lane markings. Cameras 130, 132 may be particularly good at capturing color and texture information, which is useful for accurate object recognition and classification.

Cameras 130, 132 may generally be any type of camera configured to capture video or image data in the environment around vehicle 102. For example, cameras 130, 132 may include a front facing camera (e.g., a front bumper camera, a front windshield camera, and/or a dashcam), a back facing camera (e.g., a backup camera), side facing cameras (e.g., cameras mounted in sideview mirrors), or surround cameras. Cameras 130, 132 may include color cameras or grayscale cameras. In some examples, cameras 130, 132 may include a camera system having more than one camera sensor.

As will be explained in more detail below, a controller 114 may be configured to encode video data captured by one or more of cameras 132. A video encoder executed by controller 114 may be configured to use epipolar-based constraints to reduce the complexity of estimating affine predictors. When coding a block using inter-frame affine prediction between two pictures captured by two different cameras with different resolution and/or distortion profiles (e.g., a pinhole camera and a fisheye camera), the video encoder may determine an epipolar curve from corners of the block. The epipolar curve is based on the known camera geometry of the current use case (e.g., the pose of the camera on the vehicle). This epipolar curve may be used to account for the different resolution and/or distortion profiles of the two camera and establishes a spatial correspondence between their overlapping fields of video to enable more accurate prediction. The video encoder may determine a displacement (e.g., a depth) along the epipolar curve in the reference picture that minimizes a block matching error.

The video encoder may use the determined displacement to determine other affine parameters for the affine prediction model used for the affine prediction. The video encoder may then use the affine parameters to determine a prediction block and encode the block of the current picture relative to the prediction block. By constraining the search to a single parameter (e.g., the displacement) along an epipolar curve, rather than searching two or three two-dimensional control point motion vectors, the techniques of this disclosure reduce the encoding complexity, memory requirements, and encoding times for video sources with complex motion, while still allowing for the more complex affine prediction models to be used. The techniques of this disclosure may be used for predicting blocks of video data between pictures captured by two different cameras at the same time or at different times, as long as there is at least some portion of the scene captured by the two cameras that is overlapping.

Although the techniques of this disclosure are described with respect to implementation in vehicle 102 (including ADAS), in other implementations the techniques may be used in drones, robots, ships, airplanes, helicopters, motorcycles, or other applications involving capturing video in a moving environment.

Figure 2:
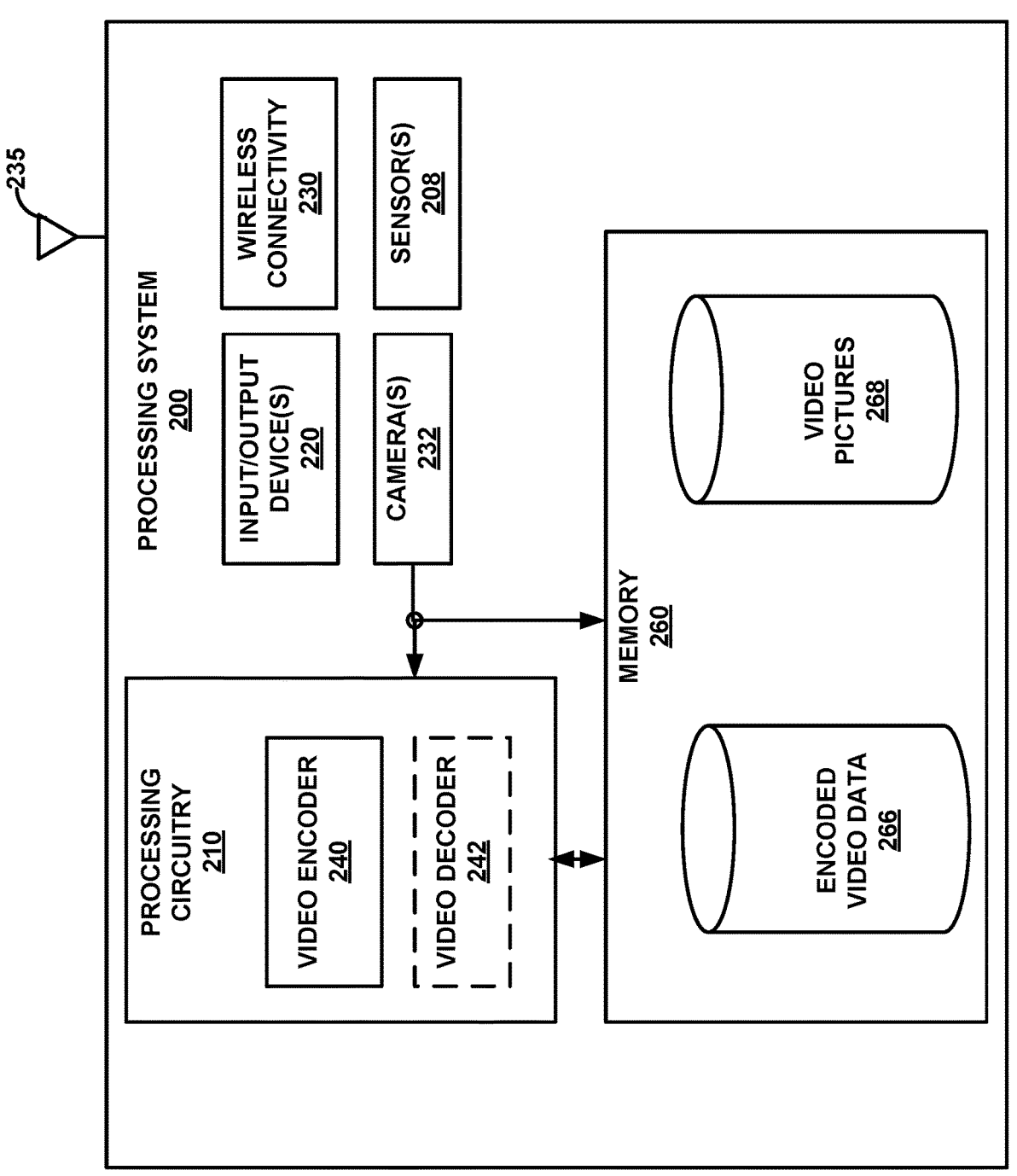
FIG. 2 is a block diagram illustrating an example computing system that may perform the techniques of this disclosure.

FIG. 2 is a block diagram illustrating an example processing system 200, in accordance with one to more techniques of this disclosure. As shown, processing system 200 comprises processing circuitry 210 and memory 260 for implementing video encoder 240 and video decoder 242 (optional). Processing circuitry 210 may represent an example instance of any controller 114 described in this disclosure, such as controllers 114A, 114B, and 114C of FIG. 1.

Processing system 200 may be used in a vehicle, such as an autonomous driving vehicle or an assisted driving vehicle (e.g., a vehicle having an advanced driver-assistance systems (ADAS) or an "ego vehicle"). In other examples, processing system 200 may be used in robotic applications, virtual reality (VR) applications, extended reality (XR), or other kinds of applications that may include, or have access to data from, one or more cameras. The techniques of this disclosure for video encoding pictures from two different cameras using epipolar-based constraints are not limited to vehicular applications. The techniques of this disclosure may be applied by any system that processes video data that are captured from two or more cameras having different resolution and/or distortion profiles.

Processing system 200 may include camera(s) 232, one or more sensor(s) 208, input/output device(s) 220, wireless connectivity component 230, and memory 260. Camera(s) 232 may be any type of camera configured to capture video or image data in the environment around processing system 100 (e.g., around a vehicle). Camera(s) 232 may include any of camera(s) 130, 132, and/or 134 described with reference to FIG. 1, including two cameras that capture at least a partially overlapping scene. The cameras may have different resolutions and/or different distortion profiles. In accordance with the techniques of this disclosure, camera(s) 232 may output video data in the form of video picture 268. Video pictures 268 may be provided directly to video encoder 240 and/or may be stored in memory 260 for later access. In general, video picture 268 represents a source of video data (i.e., raw, unencoded video data) and provides a sequential series of pictures (also referred to as "frames") of the video data to video encoder 240, which encodes data for the pictures.

Wireless connectivity component 230 may include subcomponents, for example, for third generation (3G) connectivity, fourth generation (4G) connectivity (e.g., 4G Long Term Evolution (LTE)), fifth generation (5G) connectivity (e.g., 5G or New Radio (NR)), Wi-Fi connectivity, Bluetooth connectivity, and other wireless data transmission standards. Wireless connectivity component 230 is further connected to one or more antennas 235.

Processing system 200 may also include one or more input and/or output devices 220, such as screens, touch-sensitive surfaces (including touch-sensitive displays), physical buttons, speakers, microphones, and the like. Input/output device(s) 220 (e.g., which may include an I/O controller) may manage input and output signals for processing system 200. In some cases, input/output device(s) 220 may represent a physical connection or port to an external peripheral. In some cases, input/output device(s) 220 may utilize an operating system. In other cases, input/output device(s) 220 may represent or interact with a modem, a keyboard, a mouse, a touchscreen, or a similar device. In some cases, input/output device(s) 220 may be implemented as part of a processor (e.g., a processor of processing circuitry 210). In some cases, a user may interact with a device via input/output device(s) 220 or via hardware components controlled by input/output device(s) 220.

Processing circuitry 210 may include one or more central processing units (CPUs), such as single-core or multi-core CPUs, graphics processing units (GPUs), digital signal processor (DSPs), application specific integrated circuits (ASICs), field programmable gate arrays (FPGAs), neural processing unit (NPUs), multimedia processing units, and/or the like. Instructions applied by processing circuitry 210 may be loaded, for example, from memory 260 and may cause processing circuitry 210 to perform the operations attributed to processor(s) in this disclosure. In some examples, one or more of processing circuitry 210 may be based on an Advanced Reduced Instruction Set Computer (RISC) Machine (ARM) or a RISC five (RISC-V) instruction set.

Processing circuitry 210 may also include one or more sensor processing units associated with camera(s) 232, and/or sensor(s) 208. For example, processing circuitry 210 may include one or more image signal processors associated with camera(s) 232 and/or sensor(s) 208, and/or a navigation processor associated with sensor(s) 208, which may include satellite-based positioning system components (e.g., Global Positioning System (GPS) or Global Navigation Satellite System (GLONASS)) as well as inertial positioning system components. In some aspects, sensor(s) 208 may include direct depth sensing sensors, which may function to determine a depth of or distance to objects within the environment surrounding processing system 200 (e.g., surrounding a vehicle).

Processing system 200 also includes memory 260, which is representative of one or more static and/or dynamic memories, such as a dynamic random-access memory (DRAM), a flash-based static memory, and the like. Other examples of memory 260 include random access memory (RAM), read-only memory (ROM), electrically erasable programmable ROM (EEPROM), compact disk ROM (CD-ROM), or another kind of hard disk. Memory 260 may also include solid state memory and a hard disk drive. In some examples, memory 260 is used to store computer-readable, computer-executable software including instructions that, when applied, cause a processor to perform various functions described herein. In some cases, memory 260 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within memory 260 store information in the form of a logical state.

In accordance with the techniques of this disclosure, video encoder 240 of processing system 200 may be configured to encode video data (e.g., video pictures 268) from two different cameras having different resolution and/or distortion profiles using epipolar-based constraints to reduce the complexity of estimating the affine predictors. As will be explained in more detail below, when coding a block using inter-frame affine prediction, video encoder 240 may determine an epipolar curve from corners of the block. The epipolar curve is based on the known camera geometry of the two cameras of camera(s) 232 of the current use case (e.g., the pose of the cameras on the vehicle 102 of FIG. 1). Video encoder 240 may determine a displacement (e.g., a depth) along the epipolar curve in the reference picture that minimizes a block matching error.

Video encoder 240 may use the determined displacement to determine other affine parameters for the affine prediction model used for the affine prediction. Video encoder 240 may then use the affine parameters to determine a prediction block and encode the block of the current picture relative to the prediction block to produce encoded video data 266. By constraining the search to a single parameter (e.g., the displacement) along an epipolar curve, rather than searching two or three two-dimensional control point motion vectors, the techniques of this disclosure reduce the encoding complexity, memory requirements, and encoding times for video sources with complex motion, while still allowing for the more complex affine prediction models to be used.

Video encoder 240 and video decoder 242 may operate according to a video coding standard, such as ITU-T H.265, also referred to as High Efficiency Video Coding (HEVC) or extensions thereto, such as the multi-view and/or scalable video coding extensions, or other proprietary or industry standards, such as ITU-T H.266, also referred to as Versatile Video Coding (VVC). In other examples, video encoder 240 and video decoder 242 may operate according to a proprietary video codec/format, such as AOMedia Video 1 (AV1), extensions of AV1, and/or successor versions of AV1 (e.g., AV2). In still other examples, video encoder 240 and video decoder 242 may operate according to other proprietary formats or industry standards. The techniques of this disclosure, however, are not limited to any particular coding standard or format. In general, video encoder 240 and video decoder 242 may be configured to perform the techniques of this disclosure in conjunction with any video coding techniques that use affine prediction to code video data.

In general, video encoder 240 and video decoder 242 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 240 and video decoder 242 may code video data represented in a YUV (e.g., Y, Cb, Cr) format. That is, rather than coding red, green, and blue (RGB) data for samples of a picture, video encoder 240 and video decoder 242 may code luminance and chrominance components, where the chrominance components may include both red hue and blue hue chrominance components. In some examples, video encoder 240 converts received RGB formatted data un video pictures 268 to a YUV representation prior to encoding, and video decoder 242 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 240) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 240 and video decoder 242 may be configured to operate according to VVC. According to VVC, a video coder (such as video encoder 240) partitions a picture into a plurality of CTUs. Video encoder 240 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to CUs.

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 240 and video decoder 242 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 240 may further partition a superblock into smaller coding blocks. Video encoder 240 may partition a superblock and other coding blocks into smaller blocks using square or non-square partitioning. Non-square blocks may include N/2×N, N×N/2, N/4×N, and N×N/4 blocks. Video encoder 240 and video decoder 242 may perform separate prediction and transform processes on each of the coding blocks.

AV1 also defines a tile of video data. A tile is a rectangular array of superblocks that may be coded independently of other tiles. That is, video encoder 240 and video decoder 242 may encode and decode, respectively, coding blocks within a tile without using video data from other tiles. However, video encoder 240 and video decoder 242 may perform filtering across tile boundaries. Tiles may be uniform or non-uniform in size. Tile-based coding may enable parallel processing and/or multi-threading for encoder and decoder implementations.

In some examples, video encoder 240 and video decoder 242 may use a single QTBT or MTT structure to represent each of the luminance and chrominance components, while in other examples, video encoder 240 and video decoder 242 may use two or more QTBT or MTT structures, such as one QTBT/MTT structure for the luminance component and another QTBT/MTT structure for both chrominance components (or two QTBT/MTT structures for respective chrominance components).

Video encoder 240 and video decoder 242 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 240 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 240 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 240 may generate the prediction block using one or more motion vectors. Video encoder 240 may generally perform a motion search to identify a prediction block that closely matches the CU, e.g., in terms of differences between the CU and the prediction block. Video encoder 240 may calculate a difference metric using a sum of absolute difference (SAD), sum of squared differences (SSD), mean absolute difference (MAD), mean squared differences (MSD), or other such difference calculations to determine whether a prediction block closely matches the current CU. In some examples, video encoder 240 may predict the current CU using uni-directional prediction or bi-directional prediction.

Some examples of VVC also provide an affine motion compensation mode, which may be considered an inter-prediction mode. In affine motion compensation mode, video encoder 240 may determine two or more motion vectors that represent non-translational motion, such as zoom in or out, rotation, perspective motion, or other irregular motion types. When coding blocks between two pictures captured at the same time, such affine-based inter-frame prediction may be referred to as affine prediction and may use affine prediction models.

To perform intra-prediction, video encoder 240 may select an intra-prediction mode to generate the prediction block. Some examples of VVC provide sixty-seven intra-prediction modes, including various directional modes, as well as planar mode and DC mode. In general, video encoder 240 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 240 codes CTUs and CUs in raster scan order (left to right, top to bottom).

Video encoder 240 encodes data representing the prediction mode for a current block. For example, for inter-prediction modes, video encoder 240 may encode data representing which of the various available inter-prediction modes is used, as well as motion information for the corresponding mode. For uni-directional or bi-directional inter-prediction, for example, video encoder 240 may encode motion vectors using advanced motion vector prediction (AMVP) or merge mode. Video encoder 240 may use similar modes to encode motion vectors for affine motion compensation mode and/or affine prediction mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 240 and video decoder 242 do not use video data from other frames of video data. For most intra prediction modes, video encoder 240 encodes blocks of a current frame based on the difference between sample values in the current block and predicted values generated from reference samples in the same frame. Video encoder 240 determines predicted values generated from the reference samples based on the intra prediction mode.

Following prediction, such as intra-prediction or inter-prediction of a block, video encoder 240 may calculate residual data for the block. The residual data, such as a residual block, represents sample by sample differences between the block and a prediction block for the block, formed using the corresponding prediction mode. Video encoder 240 may apply one or more transforms to the residual block, to produce transformed data in a transform domain instead of the sample domain. For example, video encoder 240 may apply a discrete cosine transform (DCT), an integer transform, a wavelet transform, or a conceptually similar transform to residual video data. Additionally, video encoder 240 may apply a secondary transform following the first transform, such as a mode-dependent non-separable secondary transform (MDNSST), a signal dependent transform, a Karhunen-Loeve transform (KLT), or the like. Video encoder 240 produces transform coefficients following application of the one or more transforms.

As noted above, following any transforms to produce transform coefficients, video encoder 240 may perform quantization of the transform coefficients. Quantization generally refers to a process in which transform coefficients are quantized to possibly reduce the amount of data used to represent the transform coefficients, providing further compression. By performing the quantization process, video encoder 240 may reduce the bit depth associated with some or all of the transform coefficients. For example, video encoder 240 may round an n-bit value down to an m-bit value during quantization, where n is greater than m. In some examples, to perform quantization, video encoder 240 may perform a bitwise right-shift of the value to be quantized.

Following quantization, video encoder 240 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 240 may utilize a predefined scan order to scan the quantized transform coefficients to produce a serialized vector, and then entropy encode the quantized transform coefficients of the vector. In other examples, video encoder 240 may perform an adaptive scan. After scanning the quantized transform coefficients to form the one-dimensional vector, video encoder 240 may entropy encode the one-dimensional vector, e.g., according to context-adaptive binary arithmetic coding (CABAC). Video encoder 240 may also entropy encode values for syntax elements describing metadata associated with the encoded video data for use by video decoder 242 in decoding the video data.

To perform CABAC, video encoder 240 may assign a context within a context model to a symbol to be transmitted. The context may relate to, for example, whether neighboring values of the symbol are zero-valued or not. The probability determination may be based on a context assigned to the symbol.

Video encoder 240 may further generate syntax data, such as block-based syntax data, picture-based syntax data, and sequence-based syntax data, to video decoder 242, e.g., in a picture header, a block header, a slice header, or other syntax data, such as a sequence parameter set (SPS), picture parameter set (PPS), or video parameter set (VPS). Video decoder 242 may likewise decode such syntax data to determine how to decode corresponding video data.

In this manner, video encoder 240 may generate a bitstream including encoded video data, e.g., syntax elements describing partitioning of a picture into blocks (e.g., CUs) and prediction and/or residual information for the blocks. Ultimately, video decoder 242 may receive the bitstream and decode the encoded video data.

In general, video decoder 242 performs a reciprocal process to that performed by video encoder 240 to decode the encoded video data of the bitstream. For example, video decoder 242 may decode values for syntax elements of the bitstream using CABAC in a manner substantially similar to, albeit reciprocal to, the CABAC encoding process of video encoder 240. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 242 may inverse quantize and inverse transform the quantized transform coefficients of a block to reproduce a residual block for the block. Video decoder 242 uses a signaled prediction mode (intra- or inter-prediction) and related prediction information (e.g., motion information for inter-prediction) to form a prediction block for the block. Video decoder 242 may then combine the prediction block and the residual block (on a sample-by-sample basis) to reproduce the original block. Video decoder 242 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 240 may signal values for syntax elements in the bitstream. In general, signaling refers to generating a value in the bitstream.

Techniques related affine prediction are described in more detail below.

Affine Motion/Prediction Models

A two-dimensional affine motion/prediction model can be described as follows:

$$\begin{cases} v_x = ax + by + e \\ v_y = cx + dy + f \end{cases},$$

wherein $(v_x, v_y)$ is a motion vector at the coordinate $(x, y)$, and a, b, c, d, e, and f are affine parameters. The above affine motion/prediction model may be referred to as a 6-parameter affine motion/prediction model. Video encoder 240 may partition a picture into blocks for block-based coding. The affine motion/prediction model for a block can also be described by the three motion vectors (MVs) $\vec{v}_0 = (v_{0x}, v_{0y})$, $\vec{v}_1 = (v_{1x}, v_{1y})$, and $\vec{v}_2 = (v_{2x}, v_{2y})$ at three different locations that are not in the same line. The three locations are usually referred to as control-points and the three motion vectors are referred to as control-point motion vectors (CPMVs). In the case when the three control-points are at three corners of the block, the affine motion can be described as follows:

$$\begin{cases} v_x = \frac{(v_{1x} - v_{0x})}{blkW}x + \frac{(v_{2x} - v_{0x})}{blkH}y + v_{0x} \\ v_y = \frac{(v_{1y} - v_{0y})}{blkW}x + \frac{(v_{2y} - v_{0y})}{blkH}y + v_{0y} \end{cases},$$

wherein blkW and blkH are the width and height of the block, respectively.

Figure 3:
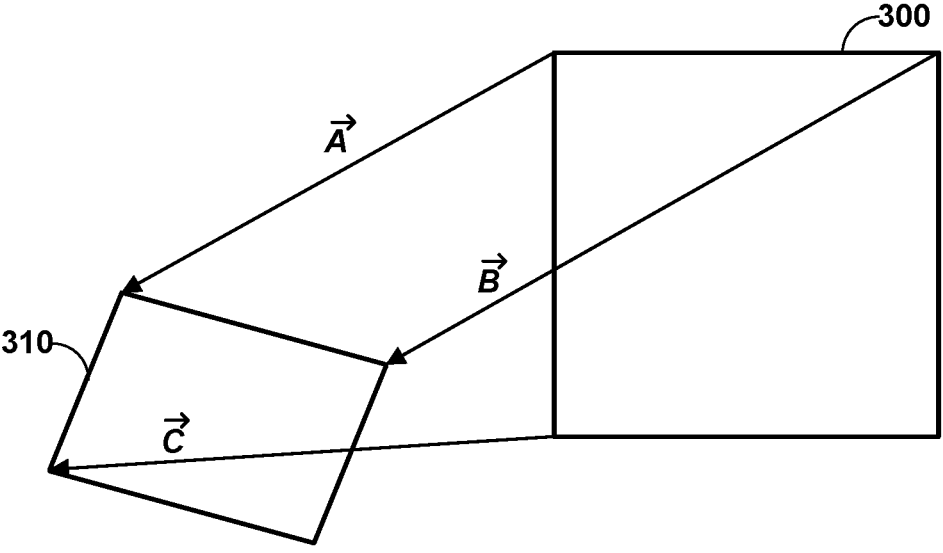
FIG. 3 illustrates an example block with control point motion vectors.

FIG. 3 illustrates an example block with control point motion vectors. Video encoder 240 may determine three CPMVs (e.g., A, B, and, C) for current block 300 at the upper left, upper right, and lower left corners of current block 300, respectively. Video encoder 240 may use the CPMVs A, B, and C to locate the corresponding corners of prediction block 310 in a reference picture. As each of the CPMVs A, B, and C may have different x and y values from each other, the CPMVs of a 6-parameter affine motion/prediction model may be better able to model more complex motion types of objects in a scene between frames, thus increasing coding efficiency.

In some example of affine motion compensation mode and/or affine prediction mode, different motion vectors (or simply vectors) can be derived for each pixel or sample in the block according to the associated affine motion/prediction model. Therefore, motion compensation can be performed pixel-by-pixel or sample-by-sample. However, to reduce complexity, subblock-based motion compensation may also be performed, wherein the block is partitioned into multiple subblocks (that have a smaller block size) and each subblock is associated with one motion vector for block-based motion compensation. The motion vector for each subblock is derived using the representative coordinate of the subblock. For example, the center position may be used as the representative coordinate.

In one example, the block is partitioned into non-overlapping subblocks. The block width is blkW, block height is blkH, the subblock width is sbW and the subblock height is sbH. As such, there are blkH/sbH rows of subblocks and blkW/sbW subblocks in each row. For a six-parameter affine motion/prediction model, the motion vector for the subblock (referred to as subblock MV) at the $i_{th}$ row (0<=i<blkW/sbW) and the $j_{th}$ (0<=j<blkH/sbH) column is derived as follows:

$$\begin{cases} v_x = \frac{(v_{1x} - v_{0x})}{blkW}\left(j*sbW + \frac{sbW}{2}\right) + \frac{(v_{2x} - v_{0x})}{blkH}\left(i*sbH + \frac{sbH}{2}\right) + v_{0x} \\ v_y = \frac{(v_{1y} - v_{0y})}{blkW}\left(j*sbW + \frac{sbW}{2}\right) + \frac{(v_{2y} - v_{0y})}{blkH}\left(i*sbH + \frac{sbH}{2}\right) + v_{0y} \end{cases}$$

In some examples, the subblock MVs are rounded to a predefined precision and stored in a motion buffer for motion compensation and motion vector prediction.

A simplified 4-parameter affine model (for zoom and rotational motion) may also be used, and is described as follows:

$$\begin{cases} v_x = ax - by + e \\ v_y = bx + ay + f \end{cases}$$

Similarly to the 6-parameter affine model, the 4-parameter affine model for a block can be described by two CPMVs $\vec{v}_0 = (v_{0x}, v_{0y})$ and $\vec{v}_1 = (v_{1x}, v_{1y})$ at two corners (typically top-left and top-right) of the block. The motion field is then described as follows:

$$\begin{cases} v_x = \dfrac{(v_{1x} - v_{0x})}{blkW}x + \dfrac{(v_{1y} - v_{0y})}{blkH}y + v_{0x} \\ v_y = \dfrac{(v_{1y} - v_{0y})}{blkW}x + \dfrac{(v_{1x} - v_{0x})}{blkH}y + v_{0y} \end{cases}$$

The subblock MV at $i_{th}$ row and $j_{th}$ column is derived as follows:

$$\begin{cases} v_x = \dfrac{(v_{1x} - v_{0x})}{blkW}\left(j*sbW + \dfrac{sbW}{2}\right) + \dfrac{(v_{1y} - v_{0y})}{blkH}\left(i*sbH + \dfrac{sbH}{2}\right) + v_{0x} \\ v_y = \dfrac{(v_{1y} - v_{0y})}{blkW}\left(j*sbW + \dfrac{sbW}{2}\right) + \dfrac{(v_{1x} - v_{0x})}{blkH}\left(i*sbH + \dfrac{sbH}{2}\right) + v_{0y} \end{cases}$$

Video encoder 240 may determine CPMVs for a block of video data to be encoded using affine motion compensation or affine prediction mode using either a 6-parameter affine/prediction model or a 4-parameter affine/prediction model. The CPMVs are used to define the location of a prediction block in a reference picture that provides for the best compression. Video encoder 240 may then encode the current block by subtracting the samples of the prediction block from the samples of the current block to produce a residual block. Video encoder 240 may then further encode the residual block using any of the techniques described above. Video encoder 240 may also encode one or more syntax elements that allow video decoder 242 to recover the CPMVs used to determine the location of the prediction block. Using the CPMVs, video decoder 242 may determine the prediction block and use the samples of the prediction block to decode the current block after decoding the residual for that block from the bitstream.

Video (e.g., video pictures 268 of FIG. 2) captured from moving cameras (e.g., cameras 130, 132, 134 on vehicle 102 of FIG. 1, or camera(s) 232 of FIG. 2) contains inherent motion in pixels, even for static objects in the scene. This pixel motion is often complex (e.g., more than just translational), even for simple forward camera translation, due to the range of depths in real-world scenes. Accurate motion prediction is typically important for effective video compression, as temporal redundancy is exploited by encoding only differences between frames.

In some example use cases, including in vehicle 102, pictures (e.g., video pictures 268 of FIG. 2) may be captured by multiple different cameras (e.g., two or more of cameras 130, 132, 134 on vehicle 102 of FIG. 1, or camera(s) 232 of FIG. 2) at the same time. The cameras may have different resolutions and/or different distortion profiles relative to each other. For examples, one camera may have a wide depth of field (e.g., a pinhole camera), but a relatively narrow field of view. Another camera may have a narrow depth of field (e.g., a fisheye camera), but a relatively wide field of view. In some examples, a fisheye camera may produce a distorted image to achieve the wide field of view.

In general, pinhole cameras may provide better images for distant objects in a scene, while fisheye cameras may better capture objects that are very close. It may be desirable to perform inter-frame prediction between two pictures captured by two different cameras that capture overlapping scenes. However, the different resolution or distortion profiles of such cameras makes prediction accuracy difficult.

More complex motion models, like the affine model in VVC described above, can improve compression but have high complexity in determining model parameters. That is affine prediction video encoding may have undesirably high processing, memory, and/or time requirements for some applications, such as encoding video in a vehicle use case.

Video compression is important for reducing data rates in applications like autonomous vehicles which capture high resolution video from multiple cameras. However, video from moving vehicles has challenging characteristics, including high speeds, zooming, and large depth variation. The complexity of finding optimal parameters for sophisticated motion models, such as affine prediction models, is therefore significant. If model parameters cannot be determined effectively, prediction quality degrades, resulting in increased bitrate for a target quality level.

In summary, complex motion inherent in video from moving cameras, and/or cameras with different resolution or distortion profiles, increases the need for accurate, flexible motion modeling for compression. But more sophisticated motion models have high complexity in parameter determination. Methods to simplify parameter search for complex models, or selectively apply simpler models, may improve compression efficiency for video from moving cameras viewing complex real-world scenes.

In accordance with the techniques of this disclosure, video encoder 240 may be configured to use epipolar-based constraints to reduce the complexity of estimating the affine predictors when performing inter-frame coding between two pictures with different resolution and/or distortion profiles. When coding a block (e.g., a CU) using inter-frame affine prediction, video encoder 240 may determine an epipolar curve from corners of the block. The epipolar curve is based on the known camera geometry of the current use case (e.g., the pose of the camera on the vehicle) and knowledge of the camera motion which may be determined form vehicle inertial measurement unit (IMU) sensors or estimated from prior video frames. Video encoder 240 may determine a displacement (e.g., a depth) along the epipolar curve in the reference picture that minimizes a block matching error. Note that in some examples, the epipolar curve may be straight and may be considered an epipolar line. In the context of this disclosure, the terms epipolar line and epipolar curve may be used interchangeably. This one-dimensional search establishes a pixel-wise correspondence between the two pictures having the different resolutions and/or distortion profiles.

Video encoder 240 may use the determined displacement to determine other affine parameters for the affine prediction model used for the affine prediction. The video encoder may then use the affine parameters to determine a prediction block and encode the block of the current picture relative to the prediction block. By constraining the search to a single parameter (e.g., the displacement) along an epipolar curve, rather than searching two or three two-dimensional control point motion vectors, the techniques of this disclosure reduce the encoding complexity, memory requirements, and encoding times for video sources with complex motion, while still allowing for the more complex affine prediction models to be used. Intelligently utilizing redundancies between the two cameras with differing resolution and/or distortion profiles may significantly reduce storage and transmission bandwidth for the captured video data through improved video encoding.

The affine prediction techniques of this disclosure use known constraints and properties of camera geometry and/or motion (e.g., the speed and/or turning radius of vehicle 102) between cameras having different resolutions and/or distortion profiles to limit the search complexity of the affine model. In vehicle and other moving camera use cases, static objects in the scene will lie along known epipolar directions. The amount of motion along an epipolar direction depends on the camera velocity, the distance to an object in the scene, and/or the known camera geometries of the two cameras being used.

An epipolar geometry describes the geometric relationship between multiple views of a scene captured by a moving camera and/or two different cameras. The epipolar geometry provides a framework for analyzing the geometric constraints that exist between different viewpoints of the same scene. When pictures of a scene are captured from two different viewpoints (e.g., two different positions of a single moving video camera or from two different cameras), there are geometric constraints between the points in the scene and their projections (images) on the camera sensors. These constraints are described by the epipolar geometry.

For any point in the scene, there is an epipolar plane that passes through this point and the two focal points of the two camera positions. When the epipolar plane intersects with the image planes of the cameras, this intersections forms lines or curves on these image planes called epipolar curves (e.g., also called epipolar lines). For any given point in one image, its corresponding point in the other image will typically lie on a specific epipolar curve. As the camera moves, the epipolar geometry changes dynamically with each new position of the camera. The epipolar curves in consecutive frames will shift according to the motion of the camera, the relative poses of the camera, and the 3D structure of the scene. The techniques of this disclosure utilize this constraint to significantly reduce the search space for matching points between the two images for the purposes of identifying a prediction block for affine prediction.

Figure 4:
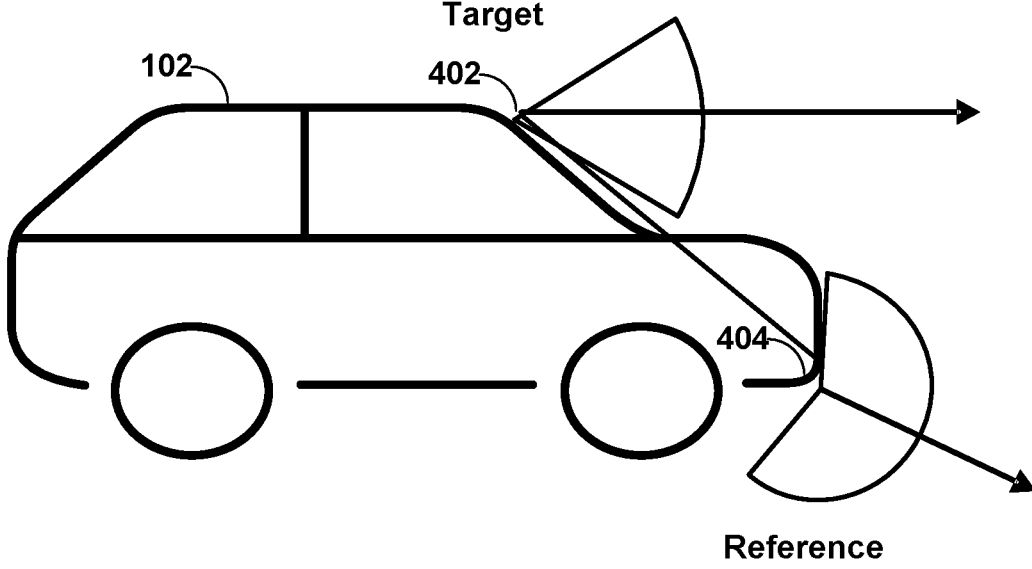
FIG. 4 illustrates an example use case with two cameras having different resolutions.

Traditional multi-view coding uses identical cameras in terms of resolution and distortion (e.g., lens distortion). In examples of this disclosure, multi-view inter-frame affine prediction is performed between two cameras having different resolutions and/or different lens distortion profiles. FIG. 4 illustrates one example use case. As shown in FIG. 4, vehicle 102 includes a first camera 402 that captures a target picture (e.g., the currently coded picture or "current picture") having a first resolution. Vehicle 102 also includes a second camera 404 that captures a reference picture having a second resolution.

In this example, the target picture and the reference picture capture at least a partially overlapping scene. In some examples, first camera 402 may be a pinhole camera, while second camera 404 may be a fisheye camera, which produces a distorted image relative to first camera 402. However, the techniques of this disclosure are applicable for use with images captured from any two cameras having any difference in resolution and/or distortion profiles.

Figure 5A:
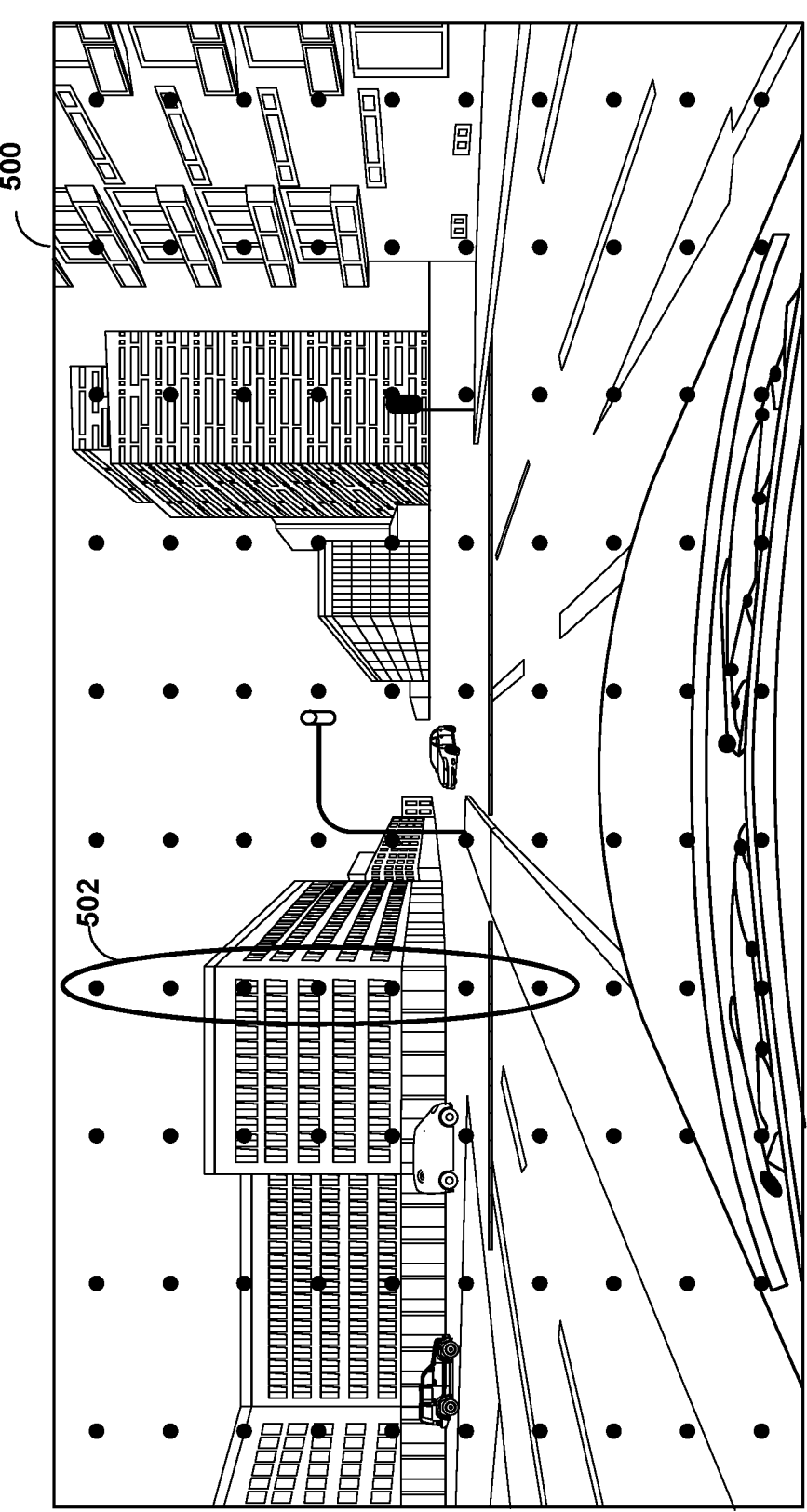
FIG. 5A illustrates a current picture having a first resolution that may be encoded using the techniques of this disclosure.
Figure 5B:
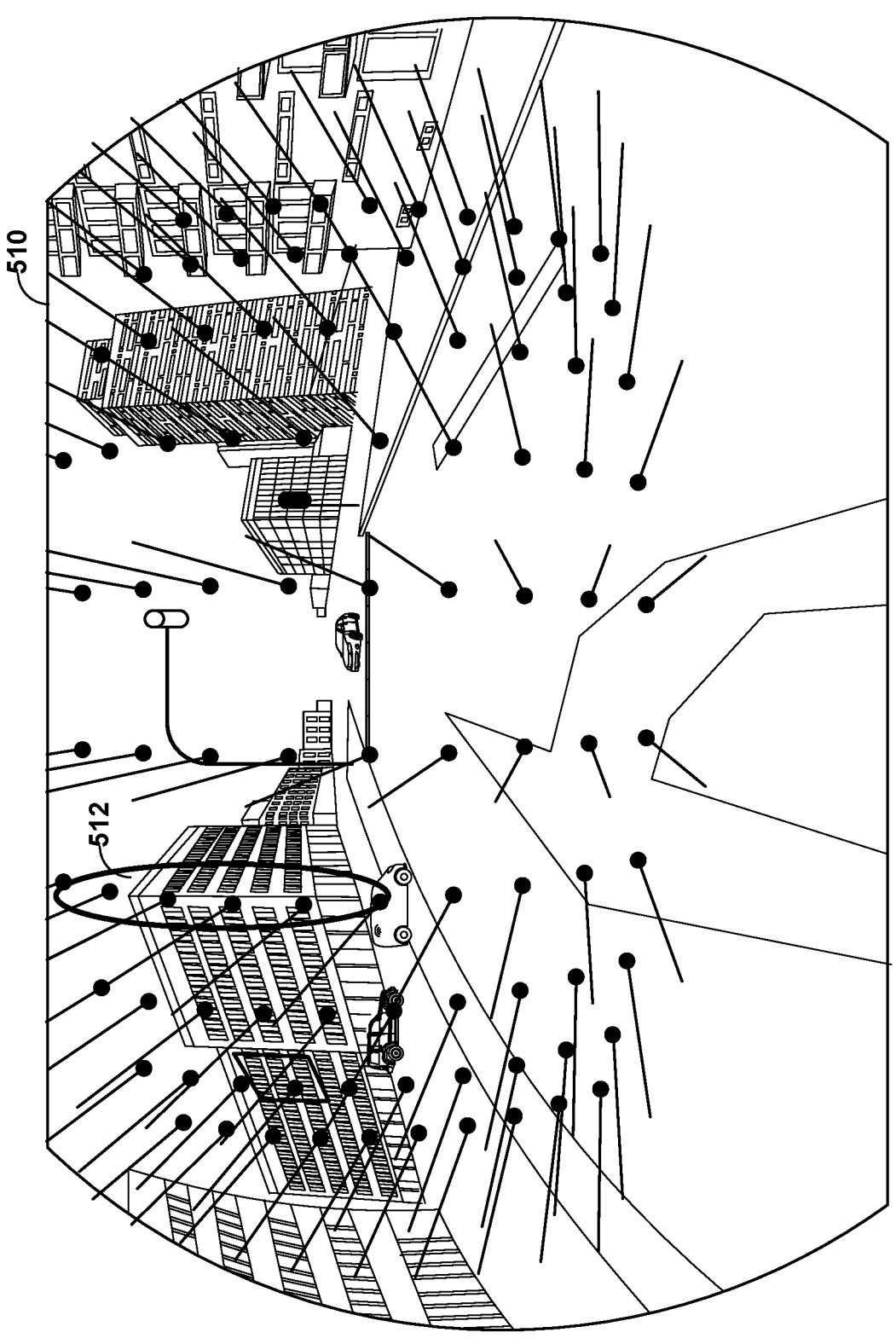
FIG. 5B illustrates a reference picture having a second resolution and epipolar curves that may be used to encode a current picture using the techniques of this disclosure.

FIG. 5A illustrates a current picture 500 that may be encoded using the techniques of this disclosure. Current picture 500 is an example of a target picture captured by first camera 402 of FIG. 4. FIG. 5B illustrates a reference picture 510 with epipolar curves that may be used to encode current picture 500 using the techniques of this disclosure. Reference picture 510 is an example of a picture captured by second camera 404 of FIG. 4. Reference picture 510 may be captured at the same time as current picture 500, or at a different time. In the example of FIG. 5B, reference picture 510 was captured by a fisheye camera and is distorted relative to current picture 500. The techniques of this disclosure are applicable to any situation where two pictures are captured by different cameras having different resolutions. Distortion may be present or may not.

The dots in current picture 500 represent example corners of block of current picture 500. Reference picture 510 illustrates dots that have the same relative corner locations, but also show epipolar curves emanating from the dots. For example, dots 502 in current picture 500 correspond to dots 512 in reference picture 510. As will be explained in more detail below, video encoder 240 may determine prediction blocks for predicting a current block by testing two or more displacements along these epipolar curves. In one example, video encoder 240 may test 16 different displacements or depths.

At two or three corners (e.g., for a 4-parameter or 6-parameter affine prediction model) of a block being encoding using affine prediction, video encoder 240 may initially compute epipolar directions and epipolar curves as a function of the relative camera geometries of the two cameras used to capture the current picture and the reference picture, respectively. Rather than performing a 4-parameter or 6-parameter search for a given block, as in VVC, video encoder 240 is configured to perform a one-parameter search. That one-parameter search is a displacement (e.g., a depth) along an epipolar curve in the reference picture.

Figure 6A:
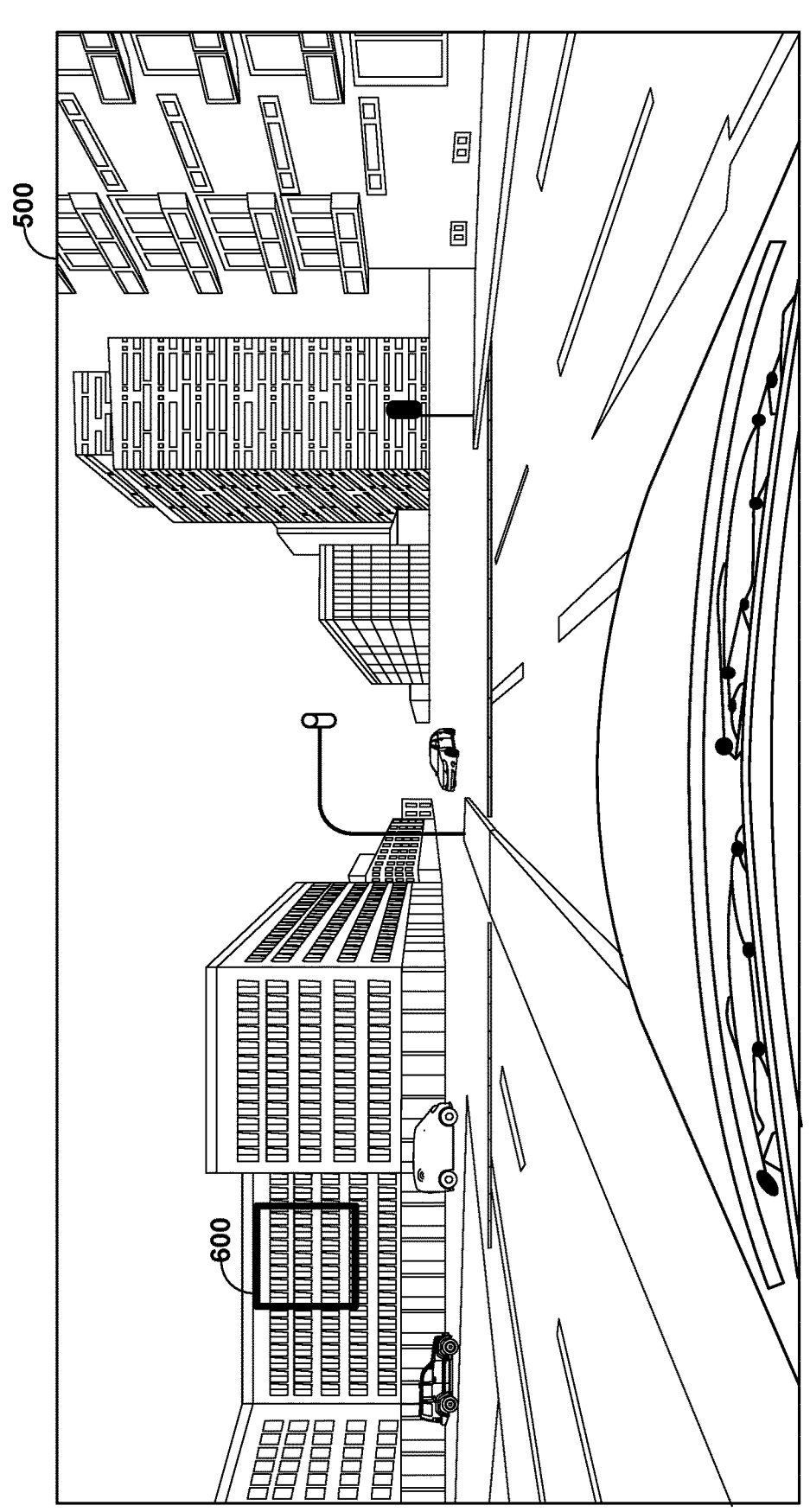
FIG. 6A illustrates a block of a current picture having a first resolution that may be encoded using the techniques of this disclosure.
Figure 6B:
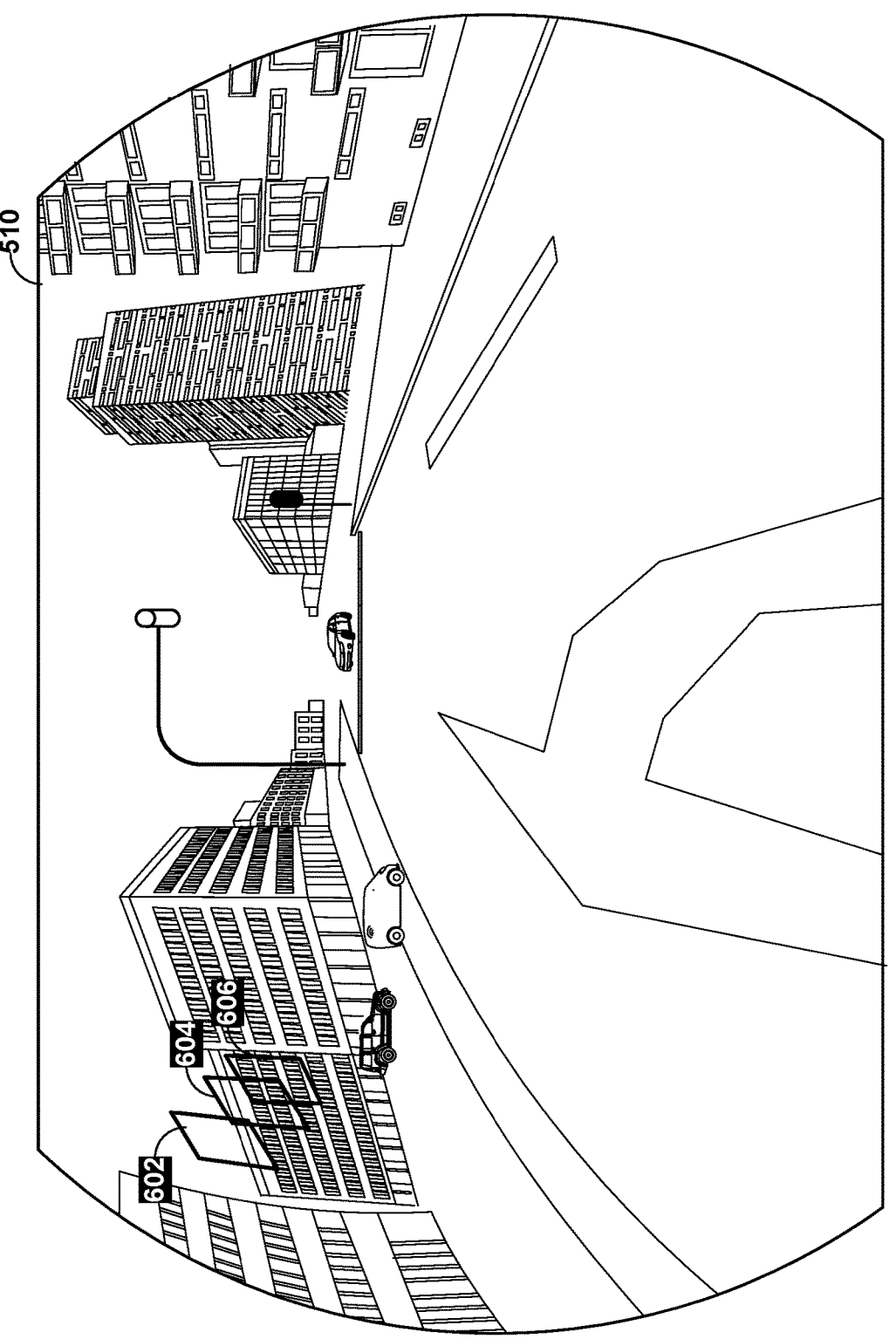
FIG. 6B illustrates potential prediction blocks in a reference picture having a second resolution that may be used to encode a current picture using the techniques of this disclosure.

As one example, video encoder 240 may determine multiple reference pictures at each of a plurality of candidate displacements along the epipolar curve. FIG. 6A illustrates a block 600 of current picture 500 having a first resolution that may be encoded using the techniques of this disclosure. FIG. 6B illustrates potential prediction blocks 602, 604, and 606 in reference picture 510. Video encoder 240 may test each of prediction blocks 602, 604, and 606 to determine which block produces the least prediction error. In some examples, more or fewer prediction blocks may be tested.

In some examples, the amount of distance between the candidate displacements to generate the prediction blocks is fixed. In other examples, the amount of distance between the candidate displacements is variable based on the camera motion and/or speed of the vehicle. For examples, particularly when using pictures captured at different times, a faster speed of the vehicle may cause video encoder 240 to use larger distances between displacements along the epipolar curves, while a slower speed of the vehicle may cause video encoder 240 to use smaller distances between displacements along the epipolar curves.

For each corner of the block, video encoder 240 may use one of the candidate displacement to determine the corners of a prediction block in the reference frame. As such, video encoder 240 may produce a list of prediction blocks; one for each of the candidate displacements. Video encoder 240 may determine the best prediction block in the list by minimize an error function. For example, video encoder 240 may select the prediction block that results in the lowest mean squared error (MSE) when used for predicting the current block. Video encoder 240 may then use the selected prediction block to determine affine prediction model parameters for the affine prediction model. Any affine prediction model may be used, including the 4-parameter and 6-parameter affine prediction models of VVC. In some examples, the parameters of the affine prediction model may be converted to CPMVs, as described above.

Video encoder 240 may then use the selected prediction block to produce a residual block. For example, video encoder 240 may subtract sample values for the prediction block from sample values of the currently encoded block to form the residual block. Video encoder 240 may perform additional encoding on the residual block as described above. In addition, video encoder 240 may encode one or more syntax elements in an encoded video bitstream that indicate the affine mode parameters and/or CPMVs to video decoder 242. In some examples, video encoder 240 may also perform an additional low complexity translational search to predict dynamic objects for further prediction improvement. The complexity of the search is reduced by searching for only a two-dimensional translation of a block. A single block size may be used and the search may be done at reduced spatial resolution to additionally lower complexity of this translation search.

In a general example, video encoder 240 may be configured to receive a first picture having a first resolution, and receive a second picture having a second resolution, wherein the second resolution is different than the first resolution, and wherein the first picture and the second picture have at least partially overlapping fields of view. Video encoder 240 may encode a current block of the first picture (e.g., the current picture), relative to the second picture (e.g., the reference picture), using affine prediction with a single parameter search, wherein the single parameter search is performed along an epipolar curve, and wherein the single parameter search is used to determine parameters of an affine prediction model.

To encode the current block, video encoder 240 may determine a plurality of one-dimensional displacements along the epipolar curve, and then determine a respective prediction block for each of the plurality of one-dimensional displacements. Video encoder 240 may then determine a best prediction block from among the respective prediction blocks. For example, video encoder 240 may minimize a block prediction error to determine the best prediction block from among the respective prediction blocks. After determining the best prediction block, video encoder 240 may determine the parameters of the affine prediction model based on the best prediction block (e.g., based on the displacement along the epipolar curve used to find the corners of the prediction block). Video encoder 240 may then calculate a residual block using the current block of the first picture and the best prediction block, encode the residual block in an encoded video bitstream, and encode one or more syntax elements indicative of the parameters of the affine prediction model in the encoded video bitstream.

As described above, video encode4 240 may constrain the affine prediction model search by utilizing epipolar geometry. The epipolar constraint is based on the property that points in one image lie on corresponding epipolar curves in the other image. The epipolar curves may be determined as function of the relative camera geometries of the cameras being used.

A camera intrinsic matrix describes the internal geometric and optical characteristics of a camera. This matrix is used for determining how a camera projects 3D points in the world onto a 2D image plane. Unlike the extrinsic parameters, which describe the camera's position and orientation in the world, the intrinsic parameters are properties of the camera itself and typically do not change unless the settings of the camera (e.g., focal length or sensor characteristics) are changed.

A camera intrinsic matrix typically includes focal lengths, principal points, and a skew coefficient. The focal lengths $(f_x, f_y)$ correspond to the focal length of a camera expressed in pixel units. The focal length can differ in the x and y directions if the camera's pixels are not square or if the lens introduces some distortion. The principal point $(c_x, c_y)$ is the point on the image plane that intersects the optical axis of the camera. In some examples, this point would be at the center of the image. The skew coefficient $(\gamma)$ accounts for the angle between the x and y pixel axes. In most cameras, the pixels are rectangular, and thus the skew coefficient is zero. However, in some cases, the pixel axes may not be perfectly perpendicular, necessitating a non-zero skew coefficient to model this effect.

The intrinsic matrix K can be represented as:

$$K = \begin{matrix} fx & \gamma & cx \\ 0 & fy & cy \\ 0 & 0 & 1 \end{matrix}$$

The relative pose of a camera refers to the position and orientation of the camera in relation to a reference frame or another camera. In the context of this disclosure, one camera is at a different position and orientation compared to the first camera. These extrinsic differences are in addition to possible differences in camera intrinsics.

For cameras with known intrinsic parameters $K_1$, $K_2$ and relative poses given by a rotation R and translation t between pictures, the epipolar curve l' in the reference pictures corresponding to a point p (e.g., a corner of a block) in the current pictures is:

$$l' = Fp$$

where F is the fundamental matrix, and is given as:

$$F = K_2^{-T}[t] \times RK_1^{-1}$$

In the above equations, [t]x is the skew symmetric matrix of translational vector t, F is the fundamental matrix, $K_1$ and $K_2$ are the the camera intrinsics matrices, R is the rotation matrix between camera poses, and $K^{-1}$ is the inverse of the corresponding camera intrinsics matrix. The fundamental matrix F encapsulates the geometric relationship between two camera views and defines epipolar constraints between corresponding points. Computing F from the known relative pose R,t and camera intrinsic matrix K allows video encoder 240 to determine epipolar curves to constrain the motion search. Note that each corner of a block lies on different epipolar curves determined by the camera constraints.

In a more specific example, the geometry between a fisheye camera and a pinhole camera may be defined as a function of their respective projections functions:

Fisheye Projection Function—$r=f(\theta)$

Pinhole Projection Function—$x=XZ/f, y=YZ/f$, where $(r, \theta)$ are fisheye image coordinates $(x,y)$ are pinhole image coordinates, $(X,Y,Z)$ are 3D world coordinates, $f$ is the pinhole focal length.

The epipolar constraint between the two camera views is:

$$x'Fx + y'Fy + Fz = 0,$$

where F is the fundamental matrix between the two views, and $(x',y')$ and $(x,y)$ are corresponding points in the fisheye and pinhole pictures, respectively.

For pinhole image point $(xp,yp)$, the corresponding fisheye image point $(xf, yf)$ lies along the epipolar curve $l(\delta)$ according the following function:

$$l(\delta) = (xf, yf) = (xp, yp) + \delta(F1, F2),$$

where $(F1,F2)$ are components of the F matrix and $\delta$ is the one-dimensional (1D) search parameter along the epipolar curve.

To generate the prediction blocks, video encoder 240 maps the four corners $(x1,y1)$, $(x2,y2)$, $(x3,y3)$, and $(x4, y4)$ of a pinhole block (e.g., a current block in the current picture) to the fisheye picture (e.g., the reference picture) using the epipolar curves $li(\delta)$ for $i=1 \ldots 4$. The depth hypothesis Z (e.g., a candidate displacement) determines the values of $\delta1, \ldots \delta4$ along each epipolar curve for the corners.

The prediction block $(Xf,Yf)$ is defined by the function:
$Xf=[xf1,xf2,xf3,xf4]$
$Yf=[yf1,yf2,yf3, yf4]$
Video encoder 240 selects the best candidate displacement Z (e.g., depth) by minimizing a prediction loss (e.g., a mean squared error (MSE) between the mapped fisheye block and the target pinhole block. The affine prediction model parameters are set based on the offsets between $(Xf,Yf)$ and $(Xp,Yp)$. This allows the generation of a full prediction picture for the pinhole picture by interpolating/extrapolating from the fisheye view using epipolar geometry, replacing the standard motion search for each block.

In a more general example, for each 4×4, or other shaped block, given the four corners $p_i$ of the current block and a 1-D parameter $\delta$ (e.g., the list of candidate displacements), video encoder 240 is configured to compute a set displaced corners $p'_{i,\delta}$ in the reference picture corresponding to a given depth hypothesis Z along each epipolar curve $l'_i$, according to the following function:

$$p'_{(i,\delta)} = l'_i(Z),$$

where $l'_i(Z)$ is a function that returns the point along line $l'_I$ given the depth Z.

The displacement $\delta$ may be in units of integer or fractional sample/pixel values. Video encoder 240 searches a range of values of $\delta$ (e.g., each of the list of candidate displacements) to find the single parameter displacement $\delta_{opt}$ that minimizes a block matching error (e.g., MSE) as follows:

$$\delta_{opt} = \text{argmin}\delta MSE(\text{Block}(\{p_i\}) - \text{Prediction}(\{p'_{i,\delta}\})) + \lambda * R(\delta_1, \ldots, \delta_n)$$

In the above equation, Prediction ( ) generates a prediction block using the displaced corner points $\{p'_{i,\delta}\}$. The parameter $\delta_{opt}$ is the optimal one-dimensional (1D) displacement for all corners along corresponding epipolar curves i, pi is corner point i of the currently coded block in the current picture, $l'_i$ is the epipolar curve corresponding to pi in the reference picture, $p'_{i,\delta}$ is the 2-D position in the reference picture of corner pi moved along epipolar curve $l'_i$ by distance $\delta$ in 3D, and $\delta$ is a candidate displacement, in 3D, common for all corners along all $l'_i$. The function argmin finds the $\delta$ (e.g., one of the candidate parameters $\delta$) that minimizes the prediction block MSE between the predictor with corners as displaced points $p'_{i,\delta}$ and corresponding block in the current picture with corner point pi.

The 1D displacement $\delta_{opt}$ is the displacement along all epipolar curves, such that the prediction block in the reference picture best matches the corresponding current block of the current picture, in a least squares sense. This constrained search replaces the full 6-parameter or 4-parameter affine model search to reduce complexity.

Video encoder 240 may also formulate a joint optimization of depth and epipolar displacements with smoothness regularization term R( ) on the displacements. The regularization term R( ) penalizes unsmooth flow given by:

$$R(\delta_1, \ldots, \delta_n) = \sum_i \sum_j w_{ij}(d_i - d_J)^2,$$

where $w_{ij}$ are weights based on the proximity of corner points i and j. This quadratic penalty on displacements differences enforces local smoothness. The hyperparameter $\lambda$ controls the smoothness tradeoff.

Video encoder 240 may minimize the energy E( ) over all $\delta_i$ jointly using optimization techniques like gradient descent to estimate the optimal smooth displacements for all corners together. This gives the optimal displacement $\delta_{opt}$ along each epipolar curve.

The above 1D displacement search process gives the displacement corner control points $p'_{i,\delta}$ for the 4 corners of a block. Video encoder 240 may then determine the affine parameters A that best transform the corners, as follows:

$$\{p_i\}:p_i \approx Ap'_{i,\delta}$$

The affine parameters A define the predictor and are included in the video bitstream. In some examples, the affine parameters A may be converted to CPMVs and the CPMVs are indicated in the bitstream. The affine parameters A or CPMVs allow a video decoder to produce the same prediction and reconstruct a block using a residual signal which is also in the bitstream.

Additional optimizations could include one or more of the following:
Using prior corner correspondence from optical flow to initialize search
Checking multiple displacement hypotheses along each epipolar curve
Adding a secondary translational search for non-static areas By constraining the affine prediction search to epipolar curves, the complexity of affine prediction is reduced from 6 or 4 parameters to a 1 parameter search per corner. This simplification enables more sophisticated motion models for improved compression efficiency. Other benefits of the proposed epipolar-constrained affine prediction estimation solution include the following:
Improves compression efficiency: Leveraging redundancy between views helps reduce residual errors, lower the encoded bitrate. This is particularly helpful for bandwidth-constrained application. For example, the techniques of this disclosure may enable bandwidth and storage savings for multi-camera systems with significant view overlap, such as autonomous vehicles.

Reduces complexity of affine model parameter search: Constraining the search to 1D along epipolar curves, the complexity of finding optimal model parameters is greatly reduced.

Robustness to camera distortions: The fundamental matrix formulation inherently handles differences in distortion profiles, such as fisheye vs pinhole, without requiring explicit modeling.

Generalized approach: The use of projective geometry means the techniques of this disclosure may be extended to other camera types.

Handles dynamic scenes well: Epipolar geometry holds regardless of motion, so the techniques of this disclosure are applicable even with non-rigid scene changes over time.

Improves prediction quality: Initializing using geometry prior to coding generates high-fidelity predictions that can also enhance learning-based refinement.

Leverages epipolar geometry: The epipolar constraint provides a way to limit and guide the search using known camera geometry, making the process more efficient.

Maintains benefits of affine model: A 6-parameter or 4-parameter affine model may still be used for motion compensation once parameters are estimated. This provides accuracy in modeling complex motions from moving cameras.

Improves compression efficiency: The more accurate motion model and estimation process improves prediction, reducing residual energy and allowing improved compression at the same quality.

Adds minimal encoding overhead: Only the final affine parameters and motion vectors need to be signaled. The epipolar-based search does not require additional side information.

Complementary to other optimizations: Can be combined with techniques like optical flow initialization and secondary translational modes.

Joint optimization capability: Incorporating regularization may enable modeling spatio-temporal correlations to further boost accuracy.

Low implementation complexity: The core computations involve simple operations, like homography warping and MSE minimization.

Compliment standards: The techniques of this disclosure may serve as an additional mode with existing codecs to leverage multi-view redundancy.

Applicable to various sequences: Can handle challenging footage from moving cameras, like drones or vehicles, viewing complex 3D scenes.

In summary, leveraging epipolar geometry allows the benefits of sophisticated affine prediction models with lower complexity. This improves compression efficiency for video captured from cameras having multiple resolutions, while maintaining low encoding overhead. The use of camera epipolar geometry limits the search space by relating parameters. A large number of parameters are linked needing only a single parameter search. The use of external motion input guides the search range and direction. The external motion is combined with the camera geometry to further refine the search.

FIG. 7 is a flow diagram illustrating an example method for encoding video data in accordance with the techniques of this disclosure. The techniques of FIG. 7 may performed by video encoder 240.

Video encoder 240 may be configured to receive a first picture having a first resolution (700), and receive a second picture having a second resolution, wherein the second resolution is different than the first resolution, and wherein the first picture and the second picture have at least partially overlapping fields of view (710). Video encoder 240 may then encode a current block of the first picture, relative to the second picture, using affine prediction with a single parameter search, wherein the single parameter search is performed along an epipolar curve, and wherein the single parameter search is used to determine parameters of an affine prediction model (720). In one example, the single parameter search uses a plurality of one-dimensional displacements along the epipolar curve. The affine prediction model may be a 4-parameter affine prediction model or a 6-parameter affine prediction model.

Figure 8:
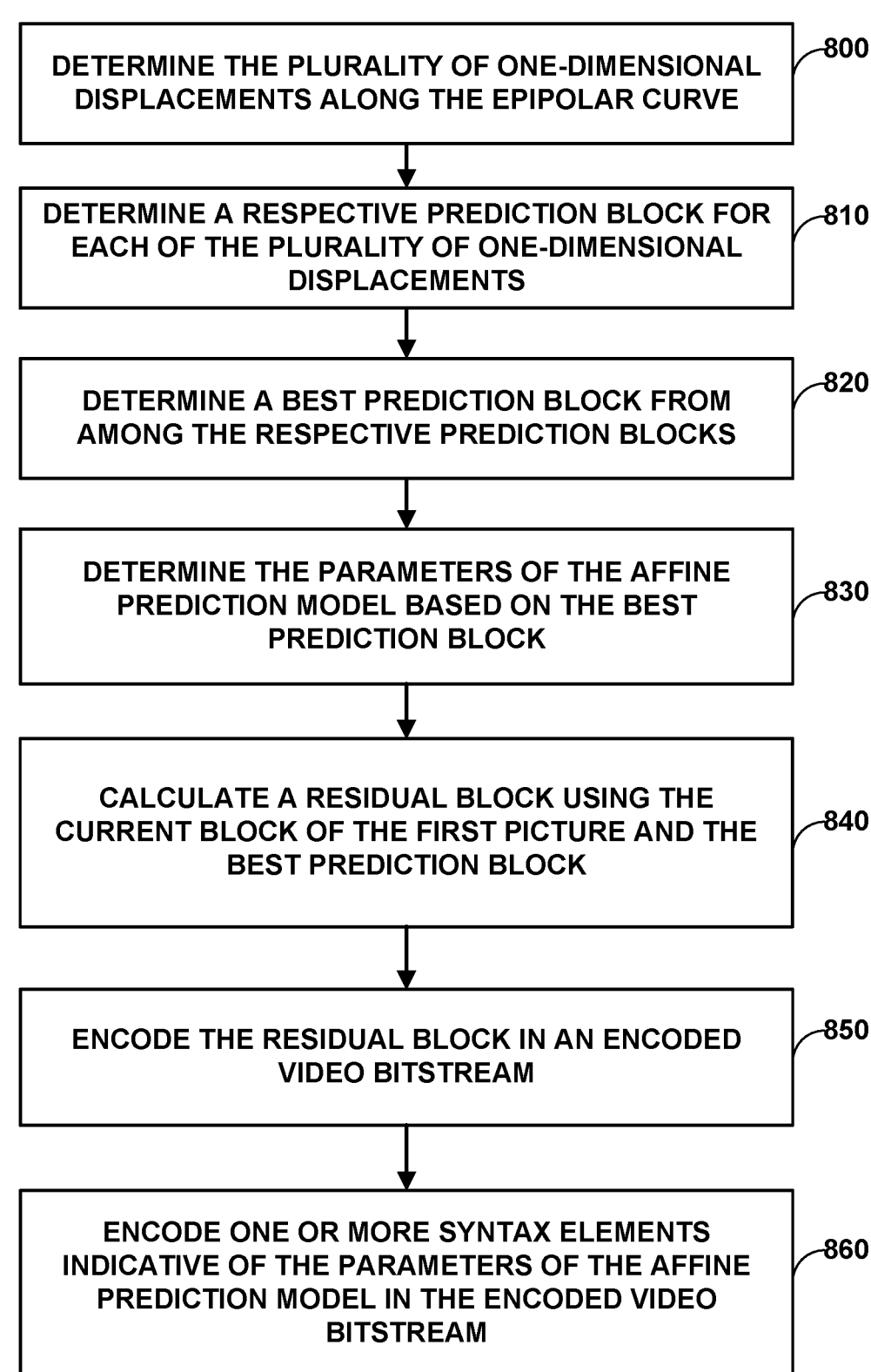
FIG. 8 is a flow diagram illustrating another example method for encoding video data in accordance with the techniques of this disclosure.

FIG. 8 is a flow diagram illustrating another example method for encoding video data in accordance with the techniques of this disclosure. More particularly, FIG. 8 further describes one example of the encoding process 720 of FIG. 7.

To encode the current block of the second picture, video encoder 240 may determine a plurality of one-dimensional displacements along the epipolar curve (800) using any of the techniques described above. Video encoder 240 may then determine a respective prediction block for each of the plurality of one-dimensional displacements (810), and determine a best prediction block from among the respective prediction block (820). For example, video encoder 240 may minimize a block prediction error to determine the best prediction block from among the respective prediction blocks. Video encoder 240 may further determine the parameters of the affine prediction model based on the best prediction block (830). Video encoder 240 may then calculate a residual block using the current block of the first picture and the best prediction block (840), encode the residual block in an encoded video bitstream (850), and encode one or more syntax elements indicative of the parameters of the affine prediction model in the encoded video bitstream (860).

In some examples, video encoder 240 may be further configured to determine the epipolar curve as a function of a first projection function for a first camera used to capture the first picture, and a second projection function for a second camera used to capture the second picture. In one example, the function is $l(\delta)=(xf,yf)=(xp,yp)+\delta(F1,F2)$, wherein $l( )$ is the epipolar curve, $(F1,F2)$ are components of a fundamental matrix defined by the first projection function and the second projection function, $(xp,yp)$ is a point in the first picture, $(xf,yf)$ is a point in the second picture, and $\delta$ is the single parameter along the epipolar curve.

The following numbered clauses illustrate one or more aspects of the devices and techniques described in this disclosure.

Aspect 1. A method of encoding video data, the method comprising: receiving a first picture having a first resolution; receiving a second picture having a second resolution, wherein the second resolution is different than the first resolution, and wherein the first picture and the second picture have at least partially overlapping fields of view; and encoding a current block of the first picture, relative to the second picture, using affine prediction with a single parameter search, wherein the single parameter search is performed along an epipolar curve, and wherein the single parameter search is used to determine parameters of an affine prediction model.

Aspect 2. The method of Aspect 1, wherein the single parameter search uses a plurality of one-dimensional displacements along the epipolar curve.

Aspect 3. The method of Aspect 2, wherein encoding the current block of the first picture comprises: determining the plurality of one-dimensional displacements along the epipolar curve; determining a respective prediction block for each of the plurality of one-dimensional displacements; determining a best prediction block from among the respective prediction blocks; determining the parameters of the affine prediction model based on the best prediction block; calculating a residual block using the current block of the first picture and the best prediction block; encoding the residual block in an encoded video bitstream; and encoding one or more syntax elements indicative of the parameters of the affine prediction model in the encoded video bitstream.

Aspect 4. The method of Aspect 3, wherein determining a best prediction block from among the respective prediction blocks comprises: minimizing a block prediction error to determine the best prediction block from among the respective prediction blocks.

Aspect 5. The method of any of Aspects 1-4, further comprising: determining the epipolar curve as a function of a first projection function for a first camera used to capture the first picture, and a second projection function for a second camera used to capture the second picture.

Aspect 6. The method of Aspect 5, wherein the function is $l(\delta)=(xf,yf)=(xp,yp)+\delta(F1,F2)$, wherein $l(\ )$ is the epipolar curve, $(F1,F2)$ are components of a fundamental matrix defined by the first projection function and the second projection function, $(xp,yp)$ is a point in the first picture, $(xf,yf)$ is a point in the second picture, and $\delta$ is the single parameter along the epipolar curve.

Aspect 7. The method of any of Aspects 1-6, wherein the second picture is distorted relative to the first picture.

Aspect 8. The method of Aspect 7, further comprising: capturing the first picture with a pinhole camera; and capturing the second picture with a fisheye camera.

Aspect 9. The method of any of Aspects 1-8, wherein the affine prediction model is a 4-parameter affine prediction model or a 6-parameter affine model.

Aspect 10. An apparatus configured to encode video data, the apparatus comprising: a memory; and processing circuitry in communication with the memory, the processing circuitry configured to: receive a first picture having a first resolution; receive a second picture having a second resolution, wherein the second resolution is different than the first resolution, and wherein the first picture and the second picture have at least partially overlapping fields of view; and encode a current block of the first picture, relative to the second picture, using affine prediction with a single parameter search, wherein the single parameter search is performed along an epipolar curve, and wherein the single parameter search is used to determine parameters of an affine prediction model.

Aspect 11. The apparatus of Aspect 10, wherein the single parameter search uses a plurality of one-dimensional displacements along the epipolar curve.

Aspect 12. The apparatus of Aspect 11, wherein to encode the current block of the first picture, the processing circuitry is further configured to: determine the plurality of one-dimensional displacements along the epipolar curve; determine a respective prediction block for each of the plurality of one-dimensional displacements; determine a best prediction block from among the respective prediction blocks; determine the parameters of the affine prediction model based on the best prediction block; calculate a residual block using the current block of the first picture and the best prediction block; encode the residual block in an encoded video bitstream; and encode one or more syntax elements indicative of the parameters of the affine prediction model in the encoded video bitstream.

Aspect 13. The apparatus of Aspect 12, wherein to determine a best prediction block from among the respective prediction blocks, the processing circuitry is further configured to: minimize a block prediction error to determine the best prediction block from among the respective prediction blocks.

Aspect 14. The apparatus of any of Aspects 10-13, wherein the processing circuitry is further configured to: determine the epipolar curve as a function of a first projection function for a first camera used to capture the first picture, and a second projection function for a second camera used to capture the second picture.

Aspect 15. The apparatus of Aspect 14, wherein the function is $l(\delta)=(xf,yf)=(xp,yp)+\delta(F1,F2)$, wherein $l(\ )$ is the epipolar curve, $(F1,F2)$ are components of a fundamental matrix defined by the first projection function and the second projection function, $(xp,yp)$ is a point in the first picture, $(xf,yf)$ is a point in the second picture, and $\delta$ is the single parameter along the epipolar curve.

Aspect 16. The apparatus of any of Aspects 10-15, wherein the second picture is distorted relative to the first picture.

Aspect 17. The apparatus of Aspect 16, wherein the processing circuitry is further configured to: capture the first picture with a pinhole camera; and capture the second picture with a fisheye camera.

Aspect 18. The apparatus of any of Aspects 10-17, wherein the affine prediction model is a 4-parameter affine prediction model or a 6-parameter affine model.

Aspect 19. The apparatus of any of Aspects 10-18, wherein the apparatus is part of a vehicle, and wherein the vehicle includes a first camera used to capture the first picture and as second camera used to capture the second picture.

Aspect 20. A non-transitory computer-readable storage medium storing instructions that, when executed, cause one or more processors of a device configured to decode video data to: receive a first picture having a first resolution; receive a second picture having a second resolution, wherein the second resolution is different than the first resolution, and wherein the first picture and the second picture have at least partially overlapping fields of view; and encode a current block of the first picture, relative to the second picture, using affine prediction with a single parameter search, wherein the single parameter search is performed along an epipolar curve, and wherein the single parameter search is used to determine parameters of an affine prediction model.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media may include one or more of random-access memory (RAM), read-only memory (ROM), electrically erasable ROM (EEPROM), compact disc ROM (CD-ROM) or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding video data, the method comprising:
   receiving a first picture having a first resolution;
   receiving a second picture having a second resolution, wherein the second resolution is different than the first resolution, and wherein the first picture and the second picture have at least partially overlapping fields of view; and
   encoding a current block of the first picture, relative to the second picture, using affine prediction with a single parameter search, wherein the single parameter search is performed along an epipolar curve and uses a plurality of one-dimensional displacements along the epipolar curve, wherein the single parameter search is used to determine parameters of an affine prediction model, and wherein encoding the current block of the first picture comprises:
   determining the plurality of one-dimensional displacements along the epipolar curve;
   determining a respective prediction block for each of the plurality of one-dimensional displacements;
   determining a best prediction block from among the respective prediction blocks;
   determining the parameters of the affine prediction model based on the best prediction block;
   calculating a residual block using the current block of the first picture and the best prediction block;
   encoding the residual block in an encoded video bitstream; and
   encoding one or more syntax elements indicative of the parameters of the affine prediction model in the encoded video bitstream.

2. The method of claim 1, wherein determining a best prediction block from among the respective prediction blocks comprises:
   minimizing a block prediction error to determine the best prediction block from among the respective prediction blocks.

3. The method of claim 1, further comprising:
   determining the epipolar curve as a function of a first projection function for a first camera used to capture the first picture, and a second projection function for a second camera used to capture the second picture.

4. The method of claim 3, wherein the function is $l(\delta)=(xf,yf)=(xp,yp)+\delta(F1,F2)$, wherein $l(\,)$ is the epipolar curve, (F1,F2) are components of a fundamental matrix defined by the first projection function and the second projection function, (xp,yp) is a point in the first picture, (xf,yf) is a point in the second picture, and $\delta$ is the single parameter along the epipolar curve.

5. The method of claim 1, wherein the second picture is distorted relative to the first picture.

6. The method of claim 5, further comprising:
   capturing the first picture with a pinhole camera; and
   capturing the second picture with a fisheye camera.

7. The method of claim 1, wherein the affine prediction model is a 4-parameter affine prediction model or a 6-parameter affine model.

8. An apparatus configured to encode video data, the apparatus comprising:
   a memory; and
   processing circuitry in communication with the memory, the processing circuitry configured to:
   receive a first picture having a first resolution;
   receive a second picture having a second resolution, wherein the second resolution is different than the first resolution, and wherein the first picture and the second picture have at least partially overlapping fields of view; and encode a current block of the first picture, relative to the second picture, using affine prediction with a single parameter search, wherein the single parameter search is performed along an epipolar curve and uses a plurality of one-dimensional displacements along the epipolar curve, wherein the single parameter search is used to determine parameters of an affine prediction model, and wherein to encode the current block of the first picture, the processing circuitry is further configured to:

determine the plurality of one-dimensional displacements along the epipolar curve;

determine a respective prediction block for each of the plurality of one-dimensional displacements;

determine a best prediction block from among the respective prediction blocks;

determine the parameters of the affine prediction model based on the best prediction block;

calculate a residual block using the current block of the first picture and the best prediction block;

encode the residual block in an encoded video bitstream; and encode one or more syntax elements indicative of the parameters of the affine prediction model in the encoded video bitstream.

9. The apparatus of claim 8, wherein to determine a best prediction block from among the respective prediction blocks, the processing circuitry is further configured to:

minimize a block prediction error to determine the best prediction block from among the respective prediction blocks.

10. The apparatus of claim 8, wherein the processing circuitry is further configured to:

determine the epipolar curve as a function of a first projection function for a first camera used to capture the first picture, and a second projection function for a second camera used to capture the second picture.

11. The apparatus of claim 10, wherein the function is $l(\delta)=(xf,yf)=(xp,yp)+\delta(F1,F2)$, wherein $l( )$ is the epipolar curve, $(F1,F2)$ are components of a fundamental matrix defined by the first projection function and the second projection function, $(xp,yp)$ is a point in the first picture, $(xf,yf)$ is a point in the second picture, and $\delta$ is the single parameter along the epipolar curve.

12. The apparatus of claim 8, wherein the second picture is distorted relative to the first picture.

13. The apparatus of claim 12, wherein the processing circuitry is further configured to:

capture the first picture with a pinhole camera; and capture the second picture with a fisheye camera.

14. The apparatus of claim 8, wherein the affine prediction model is a 4-parameter affine prediction model or a 6-parameter affine model.

15. The apparatus of claim 8, wherein the apparatus is part of a vehicle, and wherein the vehicle includes a first camera used to capture the first picture and as second camera used to capture the second picture.

16. A non-transitory computer-readable storage medium storing instructions that, when executed, cause one or more processors of a device configured to decode video data to:

receive a first picture having a first resolution;

receive a second picture having a second resolution, wherein the second resolution is different than the first resolution, and wherein the first picture and the second picture have at least partially overlapping fields of view; and encode a current block of the first picture, relative to the second picture, using affine prediction with a single parameter search, wherein the single parameter search is performed along an epipolar curve and uses a plurality of one-dimensional displacements along the epipolar curve, wherein the single parameter search is used to determine parameters of an affine prediction model, and wherein to encode the current block of the first picture, the processing circuitry is further configured to:

determine the plurality of one-dimensional displacements along the epipolar curve;

determine a respective prediction block for each of the plurality of one-dimensional displacements;

determine a best prediction block from among the respective prediction blocks;

determine the parameters of the affine prediction model based on the best prediction block;

calculate a residual block using the current block of the first picture and the best prediction block;

encode the residual block in an encoded video bitstream; and encode one or more syntax elements indicative of the parameters of the affine prediction model in the encoded video bitstream.

* * * * *